(12) United States Patent
Weerasooriya et al.

(10) Patent No.: US 9,127,210 B2
(45) Date of Patent: Sep. 8, 2015

(54) SHORT CHAIN ALKYLAMINE ALKOXYLATE COMPOSITIONS

(71) Applicant: Board of Regents, The University of Texas System, Austin, TX (US)

(72) Inventors: Upali P. Weerasooriya, Austin, TX (US); Gary A. Pope, Cedar Park, TX (US); Robin Matton, Merelbeke (BE); John Mitchell, Allentown, PA (US); Peter Roose, Sint Martnes Latern (BE)

(73) Assignees: Board of Regents, The University of Texas System, Austin, TX (US); Taminco US Inc., Allentown, PA (US)

(*) Notice: Subject to any disclaimer, the term of this patent is extended or adjusted under 35 U.S.C. 154(b) by 0 days.

(21) Appl. No.: 14/261,225

(22) Filed: Apr. 24, 2014

(65) Prior Publication Data

US 2014/0319026 A1   Oct. 30, 2014

Related U.S. Application Data

(60) Provisional application No. 61/815,627, filed on Apr. 24, 2013.

(51) Int. Cl.
*C09K 8/524* (2006.01)
*C23F 11/14* (2006.01)
*C10G 1/04* (2006.01)
*C09K 8/58* (2006.01)
*C09K 8/00* (2006.01)

(52) U.S. Cl.
CPC . *C10G 1/045* (2013.01); *C09K 8/00* (2013.01); *C09K 8/58* (2013.01)

(58) Field of Classification Search
CPC ............ Y10S 507/935; Y10S 507/936; Y10S 507/937; Y10S 507/938
USPC ......... 507/239, 244, 929, 937, 935, 936, 938; 208/324
See application file for complete search history.

(56) References Cited

U.S. PATENT DOCUMENTS

| | | | | |
|---|---|---|---|---|
| 3,629,119 A | * | 12/1971 | Weaver | ........................... 252/77 |
| 3,981,361 A | * | 9/1976 | Healy | ......................... 166/252.1 |
| 4,189,376 A | * | 2/1980 | Mitchell | ....................... 208/390 |
| 4,438,094 A | | 3/1984 | Oppenlaender et al. | |
| 5,911,276 A | | 6/1999 | Kieke | |

(Continued)

FOREIGN PATENT DOCUMENTS

| | | |
|---|---|---|
| WO | WO 2008/079855 A2 | 7/2008 |
| WO | WO 2011/094442 A1 | 8/2011 |
| WO | WO 2012/027757 A1 | 3/2012 |
| WO | 2012158645 A1 | 11/2012 |

OTHER PUBLICATIONS

International Search Report for PCT/US2014/035292, dated Sep. 29, 2014.

(Continued)

*Primary Examiner* — Aiqun Li
(74) *Attorney, Agent, or Firm* — Meunier Carlin & Curfman LLC

(57) ABSTRACT

Provided herein are, inter alia, compositions including a surfactant and a novel compound useful in enhanced oil recovery. The compositions and methods provided herein may be particularly useful for oil recovery under a broad range of reservoir conditions (e.g. high to low temperatures, high to low salinity, highly viscous oils).

10 Claims, 4 Drawing Sheets

(56) References Cited

U.S. PATENT DOCUMENTS

| | | |
|---|---|---|
| 6,225,267 B1 | 5/2001 | Eckard et al. |
| 7,629,299 B2 | 12/2009 | Berger et al. |
| 2005/0238730 A1 | 10/2005 | Le Fur et al. |
| 2010/0292110 A1 | 11/2010 | Pope et al. |

OTHER PUBLICATIONS

Tamiaki et al., Supramolecular gelation of alcohol and water by synthetic amphiphilic gallic acid derivatives, Tetrahedron 66:1661-1666, 2010.

* cited by examiner

SHORT CHAIN ALKYLAMINE ALKOXYLATE COMPOSITIONS

CROSS-REFERENCE TO RELATED APPLICATIONS

This application claims the benefit of U.S. Provisional Application No. 61/815,627 filed Apr. 24, 2013, which is hereby incorporated in its entirety and for all purposes.

BACKGROUND OF THE INVENTION

Enhanced Oil Recovery (abbreviated EOR) refers to techniques for increasing the amount of unrefined petroleum, or crude oil that may be extracted from an oil reservoir (e.g. an oil field). Using EOR, 40-60% of the reservoir's original oil can typically be extracted compared with only 20-40% using primary and secondary recovery (e.g. by water injection or natural gas injection). Enhanced oil recovery may also be referred to as improved oil recovery or tertiary recovery (as opposed to primary and secondary recovery).

Enhanced oil recovery may be achieved by a variety of methods including miscible gas injection (which includes carbon dioxide flooding), chemical injection (which includes polymer flooding, alkaline flooding and surfactant flooding), microbial injection, or thermal recovery (which includes cyclic steam, steam flooding, and fire flooding). The injection of various chemicals, usually as dilute aqueous solutions, has been used to improve oil recovery. Injection of alkaline or caustic solutions into reservoirs with oil that has organic acids or acid precursors naturally occurring in the oil will result in the production of soap (i.e. in situ generated soap) that may lower the interfacial tension enough to increase production. Injection of a dilute solution of a water soluble polymer to increase the viscosity of the injected water can increase the amount of oil recovered in some formations. Dilute solutions of surfactants such as petroleum sulfonates may be injected to lower the interfacial tension or capillary pressure that impedes oil droplets from moving through a reservoir. Special formulations of oil, water and surfactant microemulsions have also proven useful. Such formulations may further include co-solvent compounds which have the capability of increasing the solubility of the solutes in the presence of oil and are able to decrease the viscosity of an emulsion. Application of these methods is usually limited by the cost of the chemicals and their adsorption and loss onto the rock of the oil containing formation.

Therefore, there is a need in the art for cost effective methods for enhanced oil recovery using chemical injection. Provided herein are methods and compositions addressing these and other needs in the art.

BRIEF SUMMARY OF THE INVENTION

In one aspect, a compound having the formula:

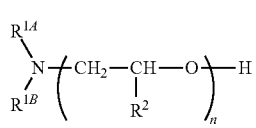

(I)

is provided. In formula (I) $R^{1A}$ and $R^{1B}$ are independently hydrogen, unsubstituted $C_1$-$C_8$ alkyl, unsubstituted cycloalkyl, unsubstituted heterocycloalkyl, unsubstituted aryl, unsubstituted heteroaryl, $C_1$-$C_6$ alkylamine or

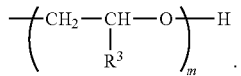

$R^2$ and $R^3$ are independently hydrogen or unsubstituted $C_1$-$C_2$ alkyl. The symbol n is an integer from 1 to 30 and m is an integer from 1 to 30.

In another aspect, an aqueous composition including the compounds provided herein (e.g., compounds having the structure of formula (I), (II), or (III)) including embodiments thereof are provided.

In another aspect, an emulsion composition is provided. The emulsion composition includes an unrefined petroleum, water, a surfactant and a compound having the formula:

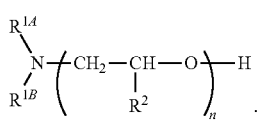

(I)

In formula (I) $R^{1A}$ and $R^{1B}$ are independently hydrogen, unsubstituted $C_1$-$C_8$ alkyl, unsubstituted cycloalkyl, unsubstituted heterocycloalkyl, unsubstituted aryl, unsubstituted heteroaryl, $C_1$-$C_6$ alkylamine or

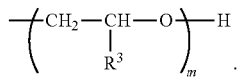

$R^2$ and $R^3$ are independently hydrogen or unsubstituted $C_1$-$C_2$ alkyl. The symbol n is an integer from 1 to 30 and m is an integer from 1 to 30.

In another aspect, a method of displacing an unrefined petroleum material in contact with a solid material is provided. The method includes contacting an unrefined petroleum material with an aqueous composition including water, a surfactant and a compound as provided herein including embodiments thereof (e.g., a compound of formula (I), (II), or (III)), wherein the unrefined petroleum material is in contact with a solid material. The unrefined petroleum material is allowed to separate from the solid material thereby displacing the unrefined petroleum material in contact with the solid material.

DETAILED DESCRIPTION OF THE INVENTION

I. Definitions

Figure 1:
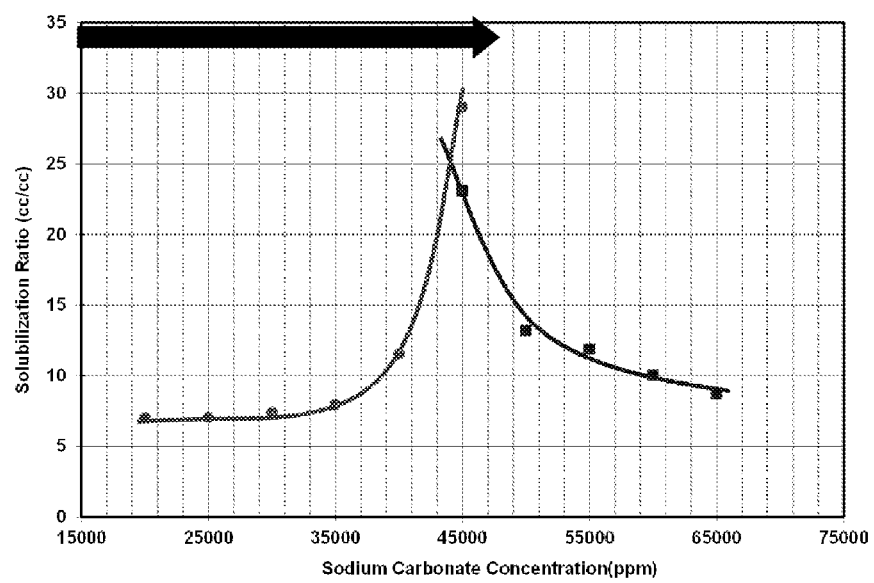
FIG. 1. Phase behavior activity (0.5% $C_{13}$-13PO sulfate, 0.5% $C_{20-24}$ IOS, 2% Diisopropylamine (DIPA)-1EO) plot with Oil #1 at 28° C. after 12 days and 30% oil with IFT of $4.8 \times 10^{-4}$ dynes/cm. The black arrow in the histogram pointing from left to right indicates the aqueous stability at 4.75% $Na_2CO_3$.
Figure 2:
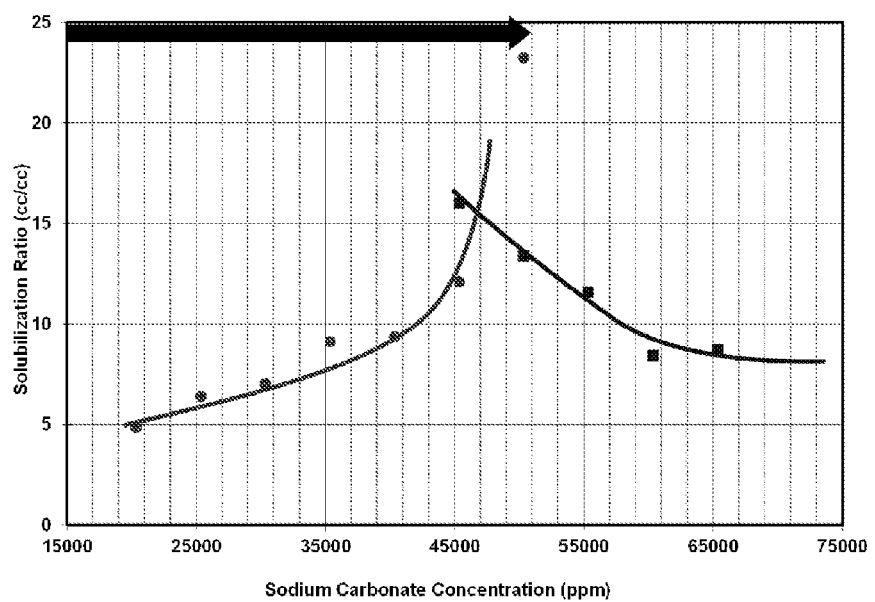
FIG. 2. Phase behavior activity (0.5% $C_{13}$-13PO sulfate, 0.5% $C_{20-24}$ IOS, 2% Isobutylalcohol-1EO) plot with Oil #1 at 28° C. after 12 days and 30% oil with IFT of $1.3 \times 10^{-3}$ dynes/cm. The black arrow in the histogram pointing from left to right indicates the aqueous stability at 4.75% $Na_2CO_3$.
Figure 3:
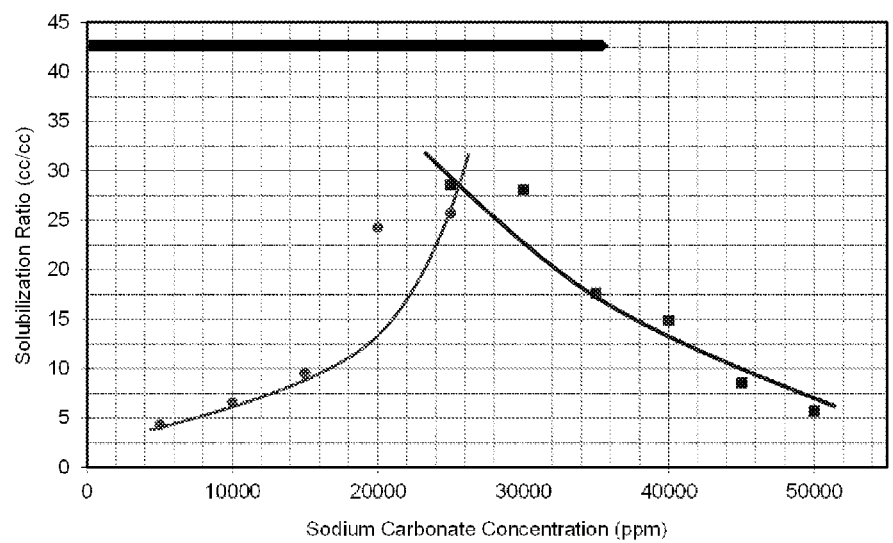
FIG. 3. Phase behavior activity (0.25% $C_{28}$-25PO-10EO sulfate, 0.25% $C_{20-24}$ IOS, 0.5% Isobutylalcohol-3EO) plot with Oil #2 at 100° C. after 12 days and 30% oil with IFT of $3.8 \times 10^{-4}$ dynes/cm. The black arrow in the histogram pointing from left to right indicates the aqueous stability at 3.5% $Na_2CO_3$.
Figure 4:
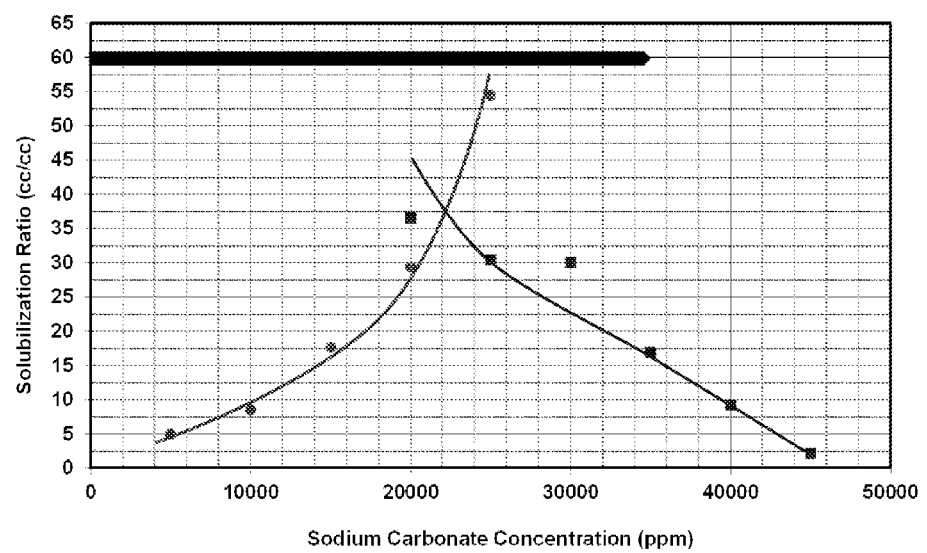
FIG. 4. Phase behavior activity (0.25% $C_{28}$-25PO-10EO sulfate, 0.25% $C_{20-24}$ IOS, 0.5% Diisopropylamine (DIPA)-3EO) plot with Oil #2 at 100° C. after 12 days and 30% oil with IFT of $2.08 \times 10^{-4}$ dynes/cm. The black arrow in the histogram pointing from left to right indicates the aqueous stability at 3.5% $Na_2CO_3$.

The abbreviations used herein have their conventional meaning within the chemical and biological arts.

Where substituent groups are specified by their conventional chemical formulae, written from left to right, they equally encompass the chemically identical substituents that would result from writing the structure from right to left, e.g., —CH$_2$O— is equivalent to —OCH$_2$—.

The term "alkyl," by itself or as part of another substituent, means, unless otherwise stated, a straight (i.e. unbranched) or branched chain which may be fully saturated, mono- or poly-unsaturated and can include di- and multivalent radicals, having the number of carbon atoms designated (i.e. $C_1$-$C_{10}$ means one to ten carbons). Examples of saturated hydrocarbon radicals include, but are not limited to, groups such as methyl, ethyl, n-propyl, isopropyl, n-butyl, t-butyl, isobutyl, sec-butyl, homologs and isomers of, for example, n-pentyl, n-hexyl, n-heptyl, n-octyl, and the like. An unsaturated alkyl group is one having one or more double bonds or triple bonds. Examples of unsaturated alkyl groups include, but are not limited to, vinyl, 2-propenyl, crotyl, 2-isopentenyl, 2-(butadienyl), 2,4-pentadienyl, 3-(1,4-pentadienyl), ethynyl, 1- and 3-propynyl, 3-butynyl, and the higher homologs and isomers. Alkyl groups which are limited to hydrocarbon groups are termed "homoalkyl". An alkoxy is an alkyl attached to the remainder of the molecule via an oxygen linker (—O—).

The term "alkylene" by itself or as part of another substituent means a divalent radical derived from an alkyl, as exemplified, but not limited, by —CH$_2$CH$_2$CH$_2$CH$_2$—, and further includes those groups described below as "heteroalkylene." Typically, an alkyl (or alkylene) group will have from 1 to 24 carbon atoms, with those groups having 10 or fewer carbon atoms being preferred in the present invention. A "lower alkyl" or "lower alkylene" is a shorter chain alkyl or alkylene group, generally having eight or fewer carbon atoms.

The term "heteroalkyl," by itself or in combination with another term, means, unless otherwise stated, a stable straight or branched chain or combinations thereof, consisting of at least one carbon atom and at least one heteroatom selected from the group consisting of O, N, P, Si and S, and wherein the nitrogen and sulfur atoms may optionally be oxidized and the nitrogen heteroatom may optionally be quaternized. The heteroatom(s) O, N, P and S and Si may be placed at any interior position of the heteroalkyl group or at the position at which the alkyl group is attached to the remainder of the molecule. Examples include, but are not limited to, —CH$_2$—CH$_2$—O—CH$_3$, —CH$_2$—CH$_2$—NH—CH$_3$, —CH$_2$—CH$_2$—N(CH$_3$)—CH$_3$, —CH$_2$—S—CH$_2$—CH$_3$, —CH$_2$—CH$_2$, —S(O)—CH$_3$, —CH$_2$—CH$_2$—S(O)$_2$—CH$_3$, —CH═CH—O—CH$_3$, —Si(CH$_3$)$_3$, —CH$_2$—CH═N—OCH$_3$, —CH═CH—N(CH$_3$)—CH$_3$, —O—CH$_3$, —O—CH$_2$—CH$_3$, and —CN. Up to two heteroatoms may be consecutive, such as, for example, —CH$_2$—NH—OCH$_3$. Similarly, the term "heteroalkylene" by itself or as part of another substituent means a divalent radical derived from heteroalkyl, as exemplified, but not limited by, —CH$_2$—CH$_2$—S—CH$_2$—CH$_2$— and —CH$_2$—S—CH$_2$—CH$_2$—NH—CH$_2$—. For heteroalkylene groups, heteroatoms can also occupy either or both of the chain termini (e.g., alkyleneoxy, alkylenedioxy, alkyleneamino, alkylenediamino, and the like). Still further, for alkylene and heteroalkylene linking groups, no orientation of the linking group is implied by the direction in which the formula of the linking group is written. For example, the formula —C(O)$_2$R'— represents both —C(O)$_2$R'— and —R'C(O)$_2$—.

The terms "cycloalkyl" and "heterocycloalkyl," by themselves or in combination with other terms, represent, unless otherwise stated, cyclic versions of "alkyl" and "heteroalkyl", respectively. Additionally, for heterocycloalkyl, a heteroatom can occupy the position at which the heterocycle is attached to the remainder of the molecule. Examples of cycloalkyl include, but are not limited to, cyclopropyl, cyclobutyl, cyclopentyl, cyclohexyl, 1-cyclohexenyl, 3-cyclohexenyl, cycloheptyl, and the like. Examples of heterocycloalkyl include, but are not limited to, 1-(1,2,5,6-tetrahydropyridyl), 1-piperidinyl, 2-piperidinyl, 3-piperidinyl, 4-morpholinyl, 3-morpholinyl, tetrahydrofuran-2-yl, tetrahydrofuran-3-yl, tetrahydrothien-2-yl, tetrahydrothien-3-yl, 1-piperazinyl, 2-piperazinyl, and the like. A "cycloalkylene" and a "heterocycloalkylene," alone or as part of another substituent means a divalent radical derived from a cycloalkyl and heterocycloalkyl, respectively.

The term "aryl" means, unless otherwise stated, a polyunsaturated, aromatic, hydrocarbon substituent which can be a single ring or multiple rings (preferably from 1 to 3 rings) which are fused together (i.e. a fused ring aryl) or linked covalently. A fused ring aryl refers to multiple rings fused together wherein at least one of the fused rings is an aryl ring. The term "heteroaryl" refers to aryl groups (or rings) that contain from one to four heteroatoms selected from N, O, and S, wherein the nitrogen and sulfur atoms are optionally oxidized, and the nitrogen atom(s) are optionally quaternized. Thus, the term "heteroaryl" includes fused ring heteroaryl groups (i.e. multiple rings fused together wherein at least one of the fused rings is a heteroaromatic ring). A 5,6-fused ring heteroarylene refers to two rings fused together, wherein one ring has 5 members and the other ring has 6 members, and wherein at least one ring is a heteroaryl ring. Likewise, a 6,6-fused ring heteroarylene refers to two rings fused together, wherein one ring has 6 members and the other ring has 6 members, and wherein at least one ring is a heteroaryl ring. And a 6,5-fused ring heteroarylene refers to two rings fused together, wherein one ring has 6 members and the other ring has 5 members, and wherein at least one ring is a heteroaryl ring. A heteroaryl group can be attached to the remainder of the molecule through a carbon or heteroatom. Non-limiting examples of aryl and heteroaryl groups include phenyl, 1-naphthyl, 2-naphthyl, 4-biphenyl, 1-pyrrolyl, 2-pyrrolyl, 3-pyrrolyl, 3-pyrazolyl, 2-imidazolyl, 4-imidazolyl, pyrazinyl, 2-oxazolyl, 4-oxazolyl, 2-phenyl-4-oxazolyl, 5-oxazolyl, 3-isoxazolyl, 4-isoxazolyl, 5-isoxazolyl, 2-thiazolyl, 4-thiazolyl, 5-thiazolyl, 2-furyl, 3-furyl, 2-thienyl, 3-thienyl, 2-pyridyl, 3-pyridyl, 4-pyridyl, 2-pyrimidyl, 4-pyrimidyl, 5-benzothiazolyl, purinyl, 2-benzimidazolyl, 5-indolyl, 1-isoquinolyl, 5-isoquinolyl, 2-quinoxalinyl, 5-quinoxalinyl, 3-quinolyl, and 6-quinolyl. Substituents for each of the above noted aryl and heteroaryl ring systems are selected from the group of acceptable substituents described below. An "arylene" and a "heteroarylene," alone or as part of another substituent means a divalent radical derived from an aryl and heteroaryl, respectively.

Where a substituent of a compound provided herein is "R-substituted" (e.g. $R^7$-substituted), it is meant that the substituent is substituted with one or more of the named R groups (e.g. $R^7$) as appropriate. In some embodiments, the substituent is substituted with only one of the named R groups.

The symbol "⌇" denotes the point of attachment of a chemical moiety to the remainder of a molecule or chemical formula.

Each R-group as provided in the formulae provided herein can appear more than once. Where an R-group appears more than once each R group can be optionally different.

The term "contacting" as used herein, refers to materials or compounds being sufficiently close in proximity to react or interact. For example, in methods of contacting a hydrocarbon material bearing formation and/or a well bore, the term "contacting" includes placing an aqueous composition (e.g. chemical, surfactant or polymer) within a hydrocarbon material bearing formation using any suitable manner known in the art (e.g., pumping, injecting, pouring, releasing, displacing, spotting or circulating the chemical into a well, well bore or hydrocarbon bearing formation).

The terms "unrefined petroleum" and "crude oil" are used interchangeably and in keeping with the plain ordinary usage of those terms. "Unrefined petroleum" and "crude oil" may be found in a variety of petroleum reservoirs (also referred to herein as a "reservoir," "oil field deposit" "deposit" and the like) and in a variety of forms including oleaginous materials, oil shales (i.e. organic-rich fine-grained sedimentary rock), tar sands, light oil deposits, heavy oil deposits, and the like. "Crude oils" or "unrefined petroleums" generally refer to a mixture of naturally occurring hydrocarbons that may be refined into diesel, gasoline, heating oil, jet fuel, kerosene, and other products called fuels or petrochemicals. Crude oils or unrefined petroleums are named according to their contents and origins, and are classified according to their per unit weight (specific gravity). Heavier crudes generally yield more heat upon burning, but have lower gravity as defined by the American Petroleum Institute (API) and market price in comparison to light (or sweet) crude oils. Crude oil may also be characterized by its Equivalent Alkane Carbon Number (EACN).

Crude oils vary widely in appearance and viscosity from field to field. They range in color, odor, and in the properties they contain. While all crude oils are mostly hydrocarbons, the differences in properties, especially the variation in molecular structure, determine whether a crude oil is more or less easy to produce, pipeline, and refine. The variations may even influence its suitability for certain products and the quality of those products. Crude oils are roughly classified into three groups, according to the nature of the hydrocarbons they contain. (i) Paraffin based crude oils contain higher molecular weight paraffins, which are solid at room temperature, but little or no asphaltic (bituminous) matter. They can produce high-grade lubricating oils. (ii) Asphaltene based crude oils contain large proportions of asphaltic matter, and little or no paraffin. Some are predominantly naphthenes and so yield lubricating oils that are sensitive to temperature changes than the paraffin-based crudes. (iii) Mixed based crude oils contain both paraffin and naphthenes, as well as aromatic hydrocarbons. Most crude oils fit this latter category.

Terms used interchangeably for crude oil throughout this disclosure are "hydrocarbon material" or "unrefined petroleum material". An "oil bank" or "oil cut" as referred to herein, is the crude oil that does not contain the injected chemicals and is pushed by the injected fluid during an enhanced oil recovery process.

The term "polymer" refers to a molecule having a structure that essentially includes the multiple repetitions of units derived, actually or conceptually, from molecules of low relative molecular mass. In some embodiments, the polymer is an oligomer.

The term "bonded" refers to having at least one of covalent bonding, hydrogen bonding, ionic bonding, Van Der Waals interactions, pi interactions, London forces or electrostatic interactions.

The term "productivity" as applied to a petroleum or oil well refers to the capacity of a well to produce hydrocarbons (e.g. unrefined petroleum); that is, the ratio of the hydrocarbon flow rate to the pressure drop, where the pressure drop is the difference between the average reservoir pressure and the flowing bottom hole well pressure (i.e., flow per unit of driving force).

The term "oil solubilization ratio" is defined as the volume of oil solubilized divided by the volume of surfactant in microemulsion. All the surfactant is presumed to be in the microemulsion phase. The oil solubilization ratio is applied for Winsor type I and type III behavior. The volume of oil solubilized is found by reading the change between initial aqueous level and excess oil (top) interface level. The oil solubilization ratio is calculated as follows:

$$\sigma_o = \frac{V_o}{V_s},$$

wherein
$\sigma_o$=oil solubilization ratio;
$V_o$=volume of oil solubilized;
$V_s$=volume of surfactant.

The term "water solubilization ratio" is defined as the volume of water solubilized divided by the volume of surfactant in microemulsion. All the surfactant is presumed to be in the microemulsion phase. The water solubilization ratio is applied for Winsor type III and type II behavior. The volume of water solubilized is found by reading the change between initial aqueous level and excess water (bottom) interface level. The water solubilization parameter is calculated as follows:

$$\sigma_w = \frac{V_w}{V_s},$$

wherein
$\sigma_w$=water solubilization ratio;
$V_w$=volume of water solubilized.

The optimum solubilization ratio occurs where the oil and water solubilization ratios are equal. The coarse nature of phase behavior screening often does not include a data point at optimum, so the solubilization ratio curves are drawn for the oil and water solubilization ratio data and the intersection of these two curves is defined as the optimum. The following is true for the optimum solubilization ratio:

$$\sigma_o = \sigma_w = \sigma^*;$$

$\sigma^*$=optimum solubilization ratio.

The term "solubility" or "solubilization" in general refers to the property of a solute, which can be a solid, liquid or gas, to dissolve in a solid, liquid or gaseous solvent thereby forming a homogenous solution of the solute in the solvent. Solubility occurs under dynamic equilibrium, which means that solubility results from the simultaneous and opposing processes of dissolution and phase joining (e.g. precipitation of solids). The solubility equilibrium occurs when the two processes proceed at a constant rate. The solubility of a given solute in a given solvent typically depends on temperature. For many solids dissolved in liquid water, the solubility increases with temperature. In liquid water at high temperatures, the solubility of ionic solutes tends to decrease due to the change of properties and structure of liquid water. In more particular, solubility and solubilization as referred to herein is the property of oil to dissolve in water and vice versa.

"Viscosity" refers to a fluid's internal resistance to flow or being deformed by shear or tensile stress. In other words, viscosity may be defined as thickness or internal friction of a liquid. Thus, water is "thin", having a lower viscosity, while oil is "thick", having a higher viscosity. More generally, the less viscous a fluid is, the greater its ease of fluidity.

The term "salinity" as used herein, refers to concentration of salt dissolved in a aqueous phases. Examples for such salts are without limitation, sodium chloride, magnesium and calcium sulfates, and bicarbonates. In more particular, the term salinity as it pertains to the present invention refers to the concentration of salts in brine and surfactant solutions.

The term "aqueous solution," "aqueous composition" or "aqueous formulation" refers to a solution having water as a solvent. The term "emulsion," "emulsion solution," "emulsion composition" or "emulsion formulation" refers to a mixture of two or more liquids which are normally immiscible. A non-limiting example for an emulsion is a mixture of oil and water.

An "alkali agent" is used according to its conventional meaning and includes basic, ionic salts of alkali metals or alkaline earth metals. Examples of alkali agents useful for the provided invention include, but are not limited to, sodium hydroxide, sodium carbonate, sodium silicate, sodium metaborate, and EDTA tetrasodium salt.

A "co-solvent" refers to a compound having the ability to increase the solubility of a solute (e.g. a surfactant, polymer) in the presence of an unrefined petroleum material. In some embodiments, the compounds provided herein including embodiments thereof function as co-solvents.

The term "alkylamine" is used according to its ordinary meaning and refers to a heteroalkane compound composed of one or more nitrogen heteroatoms, carbon atoms (e.g. $C_1$-$C_6$ alkyl or alkylene groups) and hydrogen atoms wherein at least one nitrogen atom is basic. In some embodiments, the alkylamine is a secondary amine (e.g., diisopropylamine). A "secondary amine" as provided herein is used according to its ordinary meaning and refers to an organic compound wherein the nitrogen atom is bound to a hydrogen atom and two non-hydrogen substituents, wherein the two non-hydrogen substituents are independently aryl or alkyl. In other embodiments, the alkylamine is an alkylpolyamine. An "alkylpolyamine" as provided herein is used according to its ordinary meaning and refers to an alkylamine having a plurality of nitrogen heteroatoms (e.g. $NH_2$ or NH group). Non limiting examples of alkylpolyamines are dimethylaminopropylamine (DMAPA), triethylenetetramine (TETA), and diethylenetriamine (DETA). The alkylamine or alkylpolyamine as provided herein may include saturated $C_1$-$C_6$ alkyl or alkylene bound to another substituent (e.g., $R^{1A}$ or $R^{1B}$).

The term "arylamine" is used according to its ordinary meaning and refers to a saturated 5 to 10 membered aryl ring substituted with at least one $NH_2$ group. A non-limiting example of an arylamine useful for the compositions provided herein is aniline.

An "alkylamine alkoxylate" as provided herein is used according to its ordinary meaning and refers to an alkylamine in which a nitrogen heteroatom is bonded to a hydrophilic moiety including an alcohol and/or an alkoxy portion. The term "alcohol" is used according to its ordinary meaning and refers to an organic compound containing an —OH group attached to a carbon atom. The term "alkoxy" refers to an alkyl (e.g. $C_1$-$C_4$ alkyl) group singularly bonded to oxygen. The alkoxy may be an ethoxy (—$CH_2$—$CH_2$—O—), a propoxy (—$CH_2$—CH(methyl)-O—) or a butoxy (—$CH_2$—CH(ethyl)-O—) group.

A "microemulsion" as referred to herein is a thermodynamically stable mixture of oil, water and surfactants that may also include additional components such as the compounds provided herein including embodiments thereof, electrolytes, alkali and polymers. In contrast, a "macroemulsion" as referred to herein is a thermodynamically unstable mixture of oil and water that may also include additional components. The emulsion composition provided herein may be an oil-in-water emulsion, wherein the surfactant forms aggregates (e.g. micelles) where the hydrophilic part of the surfactant molecule contacts the aqueous phase of the emulsion and the lipophilic part contacts the oil phase of the emulsion. Thus, in some embodiments, the surfactant forms part of the aqueous part of the emulsion. And in other embodiments, the surfactant forms part of the oil phase of the emulsion. In yet another embodiment, the surfactant forms part of an interface between the aqueous phase and the oil phase of the emulsion.

II. Compositions

While the making and using of various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention and do not limit the scope of the invention.

Provided herein, inter alia, are short chain alkylamine and alkylamine alkoxylate compounds and methods of using the same for a variety of applications including enhanced oil recovery. The compounds provided herein may be used as co-solvents with broad oil concentrations, at a wide range of salinities, at high reservoir temperatures and over a broad pH range. In embodiments, the compositions of the provided herein represent a cost effective alternative to commonly used EOR surfactant compositions. The compounds described herein may improve the solubility of other components present in the surfactant composition (e.g. surfactant, polymer) and be capable of lowering the viscosity of microemulsions. Further, the interfacial tension between oil and brine may be surprisingly lowered in the presence of the compounds provided herein.

In one aspect, a compound having the formula:

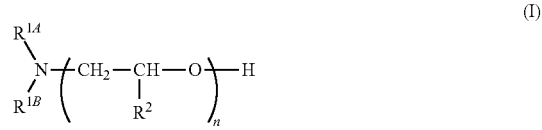

(I)

is provided. In formula (I) $R^{1A}$ and $R^{1B}$ are independently hydrogen, unsubstituted $C_1$-$C_8$ alkyl, unsubstituted cycloalkyl, unsubstituted heterocycloalkyl, unsubstituted aryl, unsubstituted heteroaryl, $C_1$-$C_6$ alkylamine or

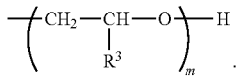

$R^2$ and $R^3$ are independently hydrogen or unsubstituted $C_1$-$C_2$ alkyl. The symbol n is an integer from 1 to 30 and m is an integer from 1 to 30.

In some embodiments, the symbol n is an integer from 1-30. In some embodiments, the symbol n is an integer from 1-28. In other embodiments, the symbol n is an integer from 1-26. In some embodiments, the symbol n is an integer from 1-24. In some embodiments, the symbol n is an integer from 1-22. In some embodiments, the symbol n is an integer from 1-20. In some embodiments, the symbol n is an integer from 1-18. In some embodiments, the symbol n is an integer from 1-16. In some embodiments, the symbol n is an integer from 1-14. In some embodiments, the symbol n is an integer from 1-12. In some embodiments, the symbol n is an integer from 1-10. In some embodiments, the symbol n is an integer from 1-8. In some embodiments, the symbol n is an integer from 1-6. In some embodiments, the symbol n is an integer from 1-4. In some embodiments, the symbol n is an integer from 1-3. In some embodiment, the symbol n is 1, 2, 3, 4, 5, 6, 7, 8, 9, 10, 11, 12, 13, 14, 15, 16, 17, 18, 19, 20, 21, 22, 23, 24, 25, 26, 27, 28, 29, or 30. In one embodiment, the symbol n is 3. In other embodiments, the symbol n is 1. In one embodiment, the symbol n is 6.

In some related embodiments, $R^2$ is hydrogen and n is as defined in an embodiment above (e.g., n is at least 1, or at least 10). Thus, in some embodiments, $R^2$ is hydrogen and n is 1. In other embodiments, $R^2$ is hydrogen and n is 3.

In some embodiments, the symbol m is an integer from 1-30. In some embodiments, the symbol m is an integer from 1-28. In other embodiments, the symbol m is an integer from 1-26. In some embodiments, the symbol m is an integer from 1-24. In some embodiments, the symbol m is an integer from 1-22. In some embodiments, the symbol m is an integer from 1-20. In some embodiments, the symbol m is an integer from 1-18. In some embodiments, the symbol m is an integer from 1-16. In some embodiments, the symbol m is an integer from 1-14. In some embodiments, the symbol m is an integer from 1-12. In some embodiments, the symbol m is an integer from 1-10. In some embodiments, the symbol m is an integer from 1-8. In some embodiments, the symbol m is an integer from 1-6. In some embodiments, the symbol m is an integer from 1-4. In some embodiments, the symbol m is an integer from 1-3. In some embodiment, the symbol m is 1, 2, 3, 4, 5, 6, 7, 8, 9, 10, 11, 12, 13, 14, 15, 16, 17, 18, 19, 20, 21, 22, 23, 24, 25, 26, 27, 28, 29, or 30. In one embodiment, the symbol m is 3. In other embodiments, the symbol m is 1. In one embodiment, the symbol m is 6.

In some related embodiments, $R^3$ is hydrogen and m is as defined in an embodiment above (e.g., n is at least 1, or at least 10). Thus, in some embodiments, $R^3$ is hydrogen and m is 1. In other embodiments, $R^3$ is hydrogen and m is 3.

As provided herein $R^{1A}$ and $R^{1B}$ may be independently hydrogen, unsubstituted $C_1$-$C_8$ (e.g., $C_1$-$C_4$)alkyl, unsubstituted $C_3$-$C_6$ (e.g., $C_6$)cycloalkyl, unsubstituted 3 to 8 membered (e.g., 6 membered) heterocycloalkyl, $C_5$-$C_8$ (e.g., $C_6$) unsubstituted aryl, unsubstituted 5 to 8 membered (e.g., 5 to 6-membered) heteroaryl, $C_1$-$C_6$ (e.g. $C_2$-$C_4$)alkylamine or

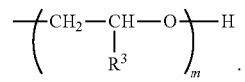

In some embodiments, $R^{1A}$ and $R^{1B}$ are independently unsubstituted $C_1$-$C_8$ alkyl. In other embodiments, $R^{1A}$ and $R^{1B}$ are independently unsubstituted $C_1$-$C_6$ alkyl. In other embodiments, $R^{1A}$ and $R^{1B}$ are independently unsubstituted $C_1$-$C_4$ alkyl. In some embodiments, $R^{1A}$ and $R^{1B}$ are unsubstituted $C_3$ alkyl. In some embodiments, the number of total carbon atoms within $R^{1A}$ and $R^{1B}$ combined does not exceed 8.

In some embodiments, $R^{1A}$ and $R^{1B}$ are independently branched or linear unsubstituted $C_1$-$C_8$ alkyl. In other embodiments, $R^{1A}$ and $R^{1B}$ are independently branched or linear unsubstituted $C_1$-$C_6$ alkyl. In other embodiments, $R^{1A}$ and $R^{1B}$ are independently branched or linear unsubstituted $C_1$-$C_4$ alkyl. In some embodiments, $R^{1A}$ and $R^{1B}$ are independently branched or linear unsubstituted $C_3$ alkyl. In some embodiments, $R^{1A}$ and $R^{1B}$ are independently linear unsubstituted $C_1$-$C_8$ alkyl. In other embodiments, $R^{1A}$ and $R^{1B}$ are independently branched unsubstituted $C_1$-$C_8$ alkyl. In some embodiments, $R^{1A}$ and $R^{1B}$ are independently linear unsubstituted $C_1$-$C_6$ alkyl. In other embodiments, $R^{1A}$ and $R^{1B}$ are independently branched unsubstituted $C_1$-$C_6$ alkyl. In some embodiments, $R^{1A}$ and $R^{1B}$ are independently linear unsubstituted $C_1$-$C_4$ alkyl. In other embodiments, $R^{1A}$ and $R^{1B}$ are independently branched unsubstituted $C_1$-$C_4$ alkyl. In some embodiments, $R^{1A}$ and $R^{1B}$ are linear unsubstituted $C_3$ alkyl. In other embodiments, $R^{1A}$ and $R^{1B}$ are branched unsubstituted $C_3$ alkyl. In some embodiments, $R^{1A}$ and $R^{1B}$ are unsubstituted isopropyl.

As provided herein $R^{1A}$ and $R^{1B}$ may be independently hydrogen or $C_1$-$C_6$ (e.g., $C_1$-$C_4$)alkylamine. In some embodiments, $R^{1A}$ and $R^{1B}$ are independently hydrogen or $C_1$-$C_6$ alkylamine. In other embodiments, $R^{1A}$ and $R^{1B}$ are independently hydrogen or $C_2$-$C_6$ alkylamine. In some embodiments, $R^{1A}$ and $R^{1B}$ are independently hydrogen or $C_3$-$C_6$ alkylamine. In other embodiments, $R^{1A}$ and $R^{1B}$ are independently hydrogen or $C_4$-$C_6$ alkylamine. In some embodiments, $R^{1A}$ and $R^{1B}$ are independently hydrogen or $C_4$ alkylamine. In other embodiments, $R^{1A}$ and $R^{1B}$ are independently hydrogen or $C_5$ alkylamine. In some embodiments, $R^{1A}$ and $R^{1B}$ are independently hydrogen or $C_6$ alkylamine.

In some embodiments, $R^{1A}$ and $R^{1B}$ are independently hydrogen or branched or linear $C_1$-$C_6$ alkylamine. In other embodiments, $R^{1A}$ and $R^{1B}$ are independently hydrogen or branched or linear $C_2$-$C_6$ alkylamine. In some embodiments, $R^{1A}$ and $R^{1B}$ are independently hydrogen or branched or linear $C_3$-$C_6$ alkylamine. In other embodiments, $R^{1A}$ and $R^{1B}$ are independently hydrogen or branched or linear $C_4$-$C_6$ alkylamine. In some embodiments, $R^{1A}$ and $R^{1B}$ are independently hydrogen or branched or linear $C_4$ alkylamine. In other embodiments, $R^{1A}$ and $R^{1B}$ are independently hydrogen or branched or linear $C_5$ alkylamine. In some embodiments, $R^{1A}$ and $R^{1B}$ are independently hydrogen or branched or linear $C_6$ alkylamine.

In some embodiments, $R^{1A}$ and $R^{1B}$ are independently hydrogen or linear $C_1$-$C_6$ alkylamine. In other embodiments, $R^{1A}$ and $R^{1B}$ are independently hydrogen or linear $C_2$-$C_6$ alkylamine. In some embodiments, $R^{1A}$ and $R^{1B}$ are independently hydrogen or linear $C_3$-$C_6$ alkylamine. In other embodiments, $R^{1A}$ and $R^{1B}$ are independently hydrogen or linear $C_4$-$C_6$ alkylamine. In some embodiments, $R^{1A}$ and $R^{1B}$ are independently hydrogen or linear $C_4$ alkylamine. In other embodiments, $R^{1A}$ and $R^{1B}$ are independently hydrogen or linear $C_5$ alkylamine. In some embodiments, $R^{1A}$ and $R^{1B}$ are independently hydrogen or linear $C_6$ alkylamine. In some embodiments, $R^{1A}$ and $R^{1B}$ are independently hydrogen or branched $C_1$-$C_6$ alkylamine. In other embodiments, $R^{1A}$ and $R^{1B}$ are independently hydrogen or branched $C_2$-$C_6$ alkylamine. In some embodiments, $R^{1A}$ and $R^{1B}$ are independently hydrogen or branched $C_3$-$C_6$ alkylamine. In other embodiments, $R^{1A}$ and $R^{1B}$ are independently hydrogen or branched $C_4$-$C_6$ alkylamine. In some embodiments, $R^{1A}$ and $R^{1B}$ are independently hydrogen or branched $C_4$ alkylamine. In other embodiments, $R^{1A}$ and $R^{1B}$ are independently hydrogen or branched $C_5$ alkylamine. In some embodiments, $R^{1A}$ and $R^{1B}$ are independently hydrogen or branched $C_6$ alkylamine.

In some embodiments, $R^{1A}$ is hydrogen and $R^{1B}$ is $C_4$-$C_6$ alkylamine. In other embodiments, $R^{1A}$ is hydrogen and $R^{1B}$ is branched or linear $C_4$-$C_6$ alkylamine. In some embodiments, $R^{1A}$ is hydrogen and $R^{1B}$ is linear $C_4$-$C_6$ alkylamine. In other embodiments, $R^{1A}$ is hydrogen and $R^{1B}$ is branched $C_4$-$C_6$ alkylamine. In some embodiments, $R^{1A}$ is hydrogen and $R^{1B}$ is $C_4$ alkylamine. In some embodiments, $R^{1A}$ is hydrogen and $R^{1B}$ is linear $C_4$ alkylamine. In other embodiments, $R^{1A}$ is hydrogen and $R^{1B}$ is $C_5$ alkylamine. In other embodiments, $R^{1A}$ is hydrogen and $R^{1B}$ is linear $C_5$ alkylamine. In other embodiments, $R^{1A}$ is hydrogen and $R^{1B}$ is $C_6$ alkylamine. In other embodiments, $R^{1A}$ is hydrogen and $R^{1B}$ is linear $C_6$ alkylamine.

$R^{1A}$ and $R^{1B}$ may be independently $C_1$-$C_6$ (e.g., $C_1$-$C_4$) alkylamine. In some embodiments, $R^{1A}$ and $R^{1B}$ are independently $C_1$-$C_6$ alkylamine. In other embodiments, $R^{1A}$ and $R^{1B}$ are independently $C_2$-$C_6$ alkylamine. In other embodiments, $R^{1A}$ and $R^{1B}$ are independently $C_3$-$C_6$ alkylamine. In other embodiments, $R^{1A}$ and $R^{1B}$ are independently $C_4$-$C_6$ alkylamine. In some embodiments, $R^{1A}$ and $R^{1B}$ are independently branched or linear $C_1$-$C_6$ alkylamine. In other embodiments, $R^{1A}$ and $R^{1B}$ are independently branched or linear $C_2$-$C_6$ alkylamine. In other embodiments, $R^{1A}$ and $R^{1B}$ are independently branched or linear $C_3$-$C_6$ alkylamine. In other embodiments, $R^{1A}$ and $R^{1B}$ are independently branched or linear $C_4$-$C_6$ alkylamine. In some embodiments, $R^{1A}$ and $R^{1B}$ are independently linear $C_1$-$C_6$ alkylamine. In other embodiments, $R^{1A}$ and $R^{1B}$ are independently linear $C_2$-$C_6$ alkylamine. In other embodiments, $R^{1A}$ and $R^{1B}$ are independently linear $C_3$-$C_6$ alkylamine. In other embodiments, $R^{1A}$ and $R^{1B}$ are independently linear $C_4$-$C_6$ alkylamine. In some embodiments, $R^{1A}$ and $R^{1B}$ are independently branched $C_1$-$C_6$ alkylamine. In other embodiments, $R^{1A}$ and $R^{1B}$ are independently branched $C_2$-$C_6$ alkylamine. In other embodiments, $R^{1A}$ and $R^{1B}$ are independently branched $C_3$-$C_6$ alkylamine. In other embodiments, $R^{1A}$ and $R^{1B}$ are independently branched $C_4$-$C_6$ alkylamine. In some embodiments, $R^{1A}$ and $R^{1B}$ are independently $C_2$ alkylamine or $C_4$ alkylamine. In some embodiments, $R^{1A}$ and $R^{1B}$ are $C_2$ alkylamine.

As described herein $R^{1A}$ and $R^{1B}$ may be an alkylpolyamine. Thus, in some embodiments, the alkylamine is an alkylpolyamine. In some embodiments, $R^{1A}$ and $R^{1B}$ are independently $C_1$-$C_6$ alkylpolyamine. In other embodiments, $R^{1A}$ and $R^{1B}$ are independently $C_2$-$C_6$ alkylpolyamine. In other embodiments, $R^{1A}$ and $R^{1B}$ are independently $C_3$-$C_6$ alkylpolyamine. In other embodiments, $R^{1A}$ and $R^{1B}$ are independently $C_4$-$C_6$ alkylpolyamine. In some embodiments, $R^{1A}$ and $R^{1B}$ are independently branched or linear $C_1$-$C_6$ alkylpolyamine. In other embodiments, $R^{1A}$ and $R^{1B}$ are independently branched or linear $C_2$-$C_6$ alkylpolyamine. In other embodiments, $R^{1A}$ and $R^{1B}$ are independently branched or linear $C_3$-$C_6$ alkylpolyamine. In other embodiments, $R^{1A}$ and $R^{1B}$ are independently branched or linear $C_4$-$C_6$ alkylpolyamine. In some embodiments, $R^{1A}$ and $R^{1B}$ are independently linear $C_1$-$C_6$ alkylpolyamine. In other embodiments, $R^{1A}$ and $R^{1B}$ are independently linear $C_2$-$C_6$ alkylpolyamine. In other embodiments, $R^{1A}$ and $R^{1B}$ are independently linear $C_3$-$C_6$ alkylpolyamine. In other embodiments, $R^{1A}$ and $R^{1B}$ are independently linear $C_4$-$C_6$ alkylpolyamine. In some embodiments, $R^{1A}$ and $R^{1B}$ are independently branched $C_1$-$C_6$ alkylpolyamine. In other embodiments, $R^{1A}$ and $R^{1B}$ are independently branched $C_2$-$C_6$ alkylpolyamine. In other embodiments, $R^{1A}$ and $R^{1B}$ are independently branched $C_3$-$C_6$ alkylpolyamine. In other embodiments, $R^{1A}$ and $R^{1B}$ are independently branched $C_4$-$C_6$ alkylpolyamine. In some embodiments, $R^{1A}$ and $R^{1B}$ are independently $C_2$ alkylamine or $C_4$ alkylpolyamine.

In some embodiments, $R^{1A}$ and $R^{1B}$ are independently hydrogen or $C_1$-$C_6$ alkylamine. In other embodiments, $R^{1A}$ and $R^{1B}$ are $C_1$-$C_6$ alkylamine. In some embodiments, $R^{1A}$ and $R^{1B}$ are $C_1$-$C_6$ alkylpolyamine. In the embodiments provided herein $R^{1A}$ and $R^{1B}$ may have the structure of formula:

(IV)

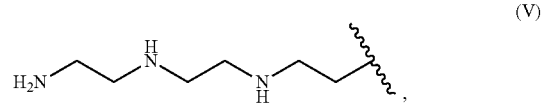 [SMILES: *CCNCCNCCN]
(V)

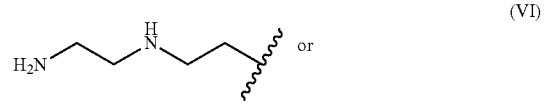 [SMILES: *CCNCCN]
(VI)
or

(VII)

In some embodiments, $R^{1A}$ is hydrogen and $R^{1B}$ has the structure of formula

(IV)

In other embodiments, $R^{1A}$ is hydrogen and $R^{1B}$ has the structure of formula

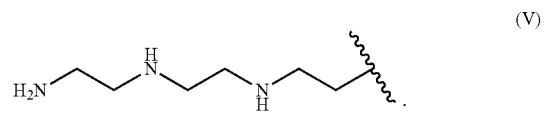
(V)

In other embodiments, $R^{1A}$ is hydrogen and $R^{1B}$ has the structure of formula

(VI)

In some embodiments, $R^{1A}$ has the structure of formula

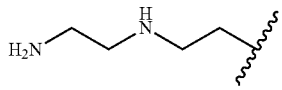
(VI)

and $R^{1B}$ has the structure of formula

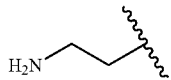
(VII)

In other embodiments, $R^{1A}$ and $R^{1B}$ have the structure of formula

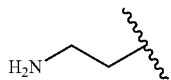
(VII)

As provided herein $R^{1A}$ and $R^{1B}$ may be independently hydrogen, unsubstituted $C_3$-$C_6$ (e.g., $C_6$)cycloalkyl or $C_5$-$C_8$ (e.g., $C_6$) unsubstituted aryl. Thus, in some embodiments, $R^{1A}$ is hydrogen and $R^{1B}$ is unsubstituted (e.g., $C_3$-$C_6$)cycloalkyl. In some embodiments, $R^{1B}$ is unsubstituted 6 membered cycloalkyl. In other embodiments, $R^{1A}$ is hydrogen and $R^{1B}$ is (e.g., $C_5$-$C_8$) unsubstituted aryl. In some embodiments, $R^{1B}$ is phenyl.

As provided herein $R^2$ and $R^3$ may be independently hydrogen or unsubstituted $C_1$-$C_2$ alkyl. Thus, in some embodiments, $R^2$ and $R^3$ are independently hydrogen, methyl or ethyl. In some embodiments, where multiple $R^2$ substituents are present and at least two $R^2$ substituents are different, $R^2$ substituents with the fewest number of carbons are present to the side of the compound of formula (I), (II), or (III) bound to the hydrogen atom. In this embodiment, the compound of formula (I), (II), or (III) will be increasingly hydrophilic in progressing from the nitrogen to the side of the compound of formula (I), (II), or (III) bound to the hydrogen atom. The term "side of the compound of formula (I), (II), or (III) bound to the hydrogen atom" refers to the side of the compound indicated by asterisk in the below structures:

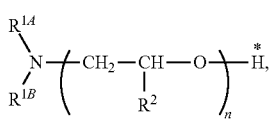
(I)

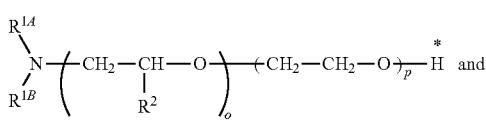
(II)

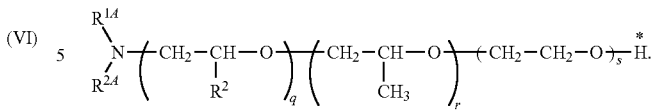
(III)

In some embodiments, the compound has the formula:

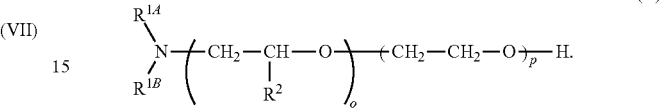
(II)

In formula (II) $R^{1A}$ and $R^{1B}$ are defined as above (e.g. hydrogen, $C_3$ alkyl, or $C_1$-$C_6$ alkylamine), $R^2$ is methyl or ethyl, o is an integer from 0 to 15 and p is an integer from 1 to 10. In some embodiments, $R^2$ is hydrogen, o is 0 and p is an integer from 1 to 6.

In some embodiments, o is 0 to 15. In some related embodiments, o is 0 to 12. In some related embodiments, o is 0 to 10. In some related embodiments, o is 0 to 8. In some related embodiments, o is 0 to 6. In some related embodiments, o is 0 to 4. In some related embodiments, o is 0 to 2. In still further related embodiments, o is 0. In some further related embodiments, p is 1 to 10. In some further related embodiment, p is 1 to 8. In some further related embodiments, p is 1 to 6. In some further related embodiment, p is 1 to 4. In some further related embodiments, p is 1 to 2. In still some further related embodiments, p is more than 1. In some further embodiment, p is 6. $R^{1A}$, $R^{1B}$ and $R^2$ may be any of the embodiments described above (e.g., $R^{1A}$ and $R^{1B}$ maybe isopropyl, $R^2$ maybe hydrogen or unsubstituted $C_1$-$C_2$ alkyl). Thus, in some embodiment, $R^{1A}$ and $R^{1B}$ are isopropyl, o is 0 and p is 3.

In some embodiments, o is 1 to 15. In some related embodiments, o is 1 to 12. In some related embodiments, o is 1 to 10. In some related embodiments, o is 1 to 8. In some related embodiments, o is 1 to 6. In some related embodiments, o is 1 to 4. In some related embodiments, o is 1 to 2. In some further related embodiments, p is 1 to 10. In some further related embodiment, p is 1 to 8. In some further related embodiments, p is 1 to 6. In some further related embodiment, p is 1 to 4. In some further related embodiment, p is 1 to 2. In still some further related embodiment, p is more than 1. $R^{1A}$, $R^{1B}$ and $R^2$ may be any of the embodiments described above (e.g., $R^{1A}$ and $R^{1B}$ maybe isopropyl, $R^2$ maybe hydrogen or unsubstituted $C_1$-$C_2$ alkyl).

In some embodiments, o is 2 to 15. In some related embodiments, o is 2 to 12. In some related embodiments, o is 2 to 10. In some related embodiments, o is 2 to 8. In some related embodiments, o is 2 to 6. In some related embodiments, o is 2 to 4. In some further related embodiment, p is 1 to 10. In some further related embodiment, p is 1 to 8. In some further related embodiment, p is 1 to 6. In some further related embodiment, p is 1 to 4. In some further related embodiment, p is 1 to 2. In still some further related embodiment, p is more than 1. $R^{1A}$, $R^{1B}$ and $R^2$ may be any of the embodiments described above (e.g., $R^{1A}$ and $R^{1B}$ maybe isopropyl, $R^2$ maybe hydrogen or unsubstituted $C_1$-$C_2$ alkyl).

In some embodiments, o is 4 to 15. In some related embodiments, o is 4 to 12. In some related embodiments, o is 4 to 10. In some related embodiments, o is 4 to 8. In some related embodiments, o is 4 to 6. In some further related embodiment, p is 1 to 10. In some further related embodiment, p is 1 to 8. In some further related embodiment, p is 1 to 6. In some further related embodiment, p is 1 to 4. In some further related embodiment, p is 1 to 2. In still some further related embodiment, p is more than 1. $R^{1A}$, $R^{1B}$ and $R^2$ may be any of the embodiments described above (e.g., $R^{1A}$ and $R^{1B}$ maybe isopropyl, $R^2$ maybe hydrogen or unsubstituted $C_1$-$C_2$ alkyl).

In some embodiments, o is 6 to 15. In some related embodiments, o is 6 to 12. In some related embodiments, o is 6 to 10. In some related embodiments, o is 6 to 8. In some further related embodiment, p is 1 to 10. In some further related embodiment, p is 1 to 8. In some further related embodiment, p is 1 to 6. In some further related embodiment, p is 1 to 4. In some further related embodiment, p is 1 to 2. In still some further related embodiment, p is more than 1. $R^{1A}$, $R^{1B}$ and $R^2$ may be any of the embodiments described above (e.g., $R^{1A}$ and $R^{1B}$ maybe isopropyl, $R^2$ maybe hydrogen or unsubstituted $C_1$-$C_2$ alkyl).

In some embodiments, o is 8 to 15. In some related embodiments, o is 8 to 12. In some related embodiments, o is 8 to 10. In some further related embodiment, p is 1 to 10. In some further related embodiment, p is 1 to 8. In some further related embodiment, p is 1 to 6. In some further related embodiment, p is 1 to 4. In some further related embodiment, p is 1 to 2. In still some further related embodiment, p is more than 1. $R^{1A}$, $R^{1B}$ and $R^2$ may be any of the embodiments described above (e.g., $R^{1A}$ and $R^{1B}$ maybe isopropyl, $R^2$ maybe hydrogen or unsubstituted $C_1$-$C_2$ alkyl).

In some embodiments, o is 10 to 15. In some related embodiments, o is 10 to 12. In some further related embodiment, p is 1 to 10. In some further related embodiment, p is 1 to 8. In some further related embodiment, p is 1 to 6. In some further related embodiment, p is 1 to 4. In some further related embodiment, p is 1 to 2. In still some further related embodiment, p is more than 1. $R^{1A}$, $R^{1B}$ and $R^2$ may be any of the embodiments described above (e.g., $R^{1A}$ and $R^{1B}$ maybe isopropyl, $R^2$ maybe hydrogen or unsubstituted $C_1$-$C_2$ alkyl).

In some embodiments, o is 12 to 15. In some further related embodiment, p is 1 to 10. In some further related embodiment, p is 1 to 8. In some further related embodiment, p is 1 to 6. In some further related embodiment, p is 1 to 4. In some further related embodiment, p is 1 to 2. In still some further related embodiment, p is more than 1. $R^{1A}$, $R^{1B}$ and $R^2$ may be any of the embodiments described above (e.g., $R^{1A}$ and $R^{1B}$ maybe isopropyl, $R^2$ maybe hydrogen or unsubstituted $C_1$-$C_2$ alkyl).

In other embodiments, the compound has the formula:

$$\begin{array}{c} R^{1A} \\ \diagdown \\ N \\ \diagup \\ R^{1B} \end{array} \left( CH_2-CH-O \atop R^2 \right)_q \left( CH_2-CH-O \atop CH_3 \right)_r (CH_2-CH_2-O)_s H. \quad (III)$$

In formula (III) $R^2$ is ethyl, q is an integer from 0 to 10, r is an integer from 0 to 10 and s is an integer from 1 to 10.

In some embodiment, q is 0 to 10. In some related embodiment, q is 1 to 10. In some related embodiment, q is 2 to 10. In some related embodiment, q is 3 to 10. In some related embodiment, q is 4 to 10. In some related embodiment, q is 5 to 10. In some related embodiment, q is 6 to 10. In some related embodiment, q is 7 to 10. In some related embodiment, q is 8 to 10. In some related embodiment, q is 9 to 10. Moreover, in still further related embodiments, q is 0. In some further related embodiment, r is 0 to 10. In some further related embodiment, r is 1 to 10. In some further related embodiment, r is 2 to 10. In some further related embodiment, r is 3 to 10. In some further related embodiment, r is 4 to 10. In some further related embodiment, r is 5 to 10. In some further related embodiment, r is 6 to 10. In some further related embodiment, r is 7 to 10. In some further related embodiment, r is 8 to 10. In some further related embodiment, r is 9 to 10. Moreover, in still further related embodiments, r is 0. In still some further embodiment, s is 1 to 10. In still some further embodiment, s is 2 to 10. In still some further embodiment, s is 3 to 10. In still some further embodiment, is 4 to 10. In still some further embodiment, s is 5 to 10. In still some further embodiment, s is 6 to 10. In still some further embodiment, s is 7 to 10. In still some further embodiment, s is 8 to 10. In still some further embodiment, s is 9 to 10. $R^{1A}$, $R^{1B}$ and $R^2$ may be any of the embodiments described above (e.g., $R^{1A}$ and $R^{1B}$ maybe isopropyl, $R^2$ maybe hydrogen or unsubstituted $C_1$-$C_2$ alkyl).

In some embodiment, q is 0 to 9. In some related embodiment, q is 1 to 9. In some related embodiment, q is 2 to 9. In some related embodiment, q is 3 to 9. In some related embodiment, q is 4 to 9. In some related embodiment, q is 5 to 9. In some related embodiment, q is 6 to 9. In some related embodiment, q is 7 to 9. In some related embodiment, q is 8 to 9. Moreover, in still further related embodiments, q is 0. In some further related embodiment, r is 0 to 10. In some further related embodiment, r is 1 to 10. In some further related embodiment, r is 2 to 10. In some further related embodiment, r is 3 to 10. In some further related embodiment, r is 4 to 10. In some further related embodiment, r is 5 to 10. In some further related embodiment, r is 6 to 10. In some further related embodiment, r is 7 to 10. In some further related embodiment, r is 8 to 10. In some further related embodiment, r is 9 to 10. Moreover, in still further related embodiments, r is 0. In still some further embodiment, s is 1 to 10. In still some further embodiment, s is 2 to 10. In still some further embodiment, s is 3 to 10. In still some further embodiment, s is 4 to 10. In still some further embodiment, s is 5 to 10. In still some further embodiment, s is 6 to 10. In still some further embodiment, s is 7 to 10. In still some further embodiment, s is 8 to 10. In still some further embodiment, s is 9 to 10. $R^{1A}$, $R^{1B}$ and $R^2$ may be any of the embodiments described above (e.g., $R^{1A}$ and $R^{1B}$ maybe isopropyl, $R^2$ maybe hydrogen or unsubstituted $C_1$-$C_2$ alkyl).

In some embodiment, q is 0 to 8. In some related embodiment, q is 1 to 8. In some related embodiment, q is 2 to 8. In some related embodiment, q is 3 to 8. In some related embodiment, q is 4 to 8. In some related embodiment, q is 5 to 8. In some related embodiment, q is 6 to 8. In some related embodiment, q is 7 to 8. Moreover, in still further related embodiments, q is 0. In some further related embodiment, r is 0 to 10. In some further related embodiment, r is 1 to 10. In some further related embodiment, r is 2 to 10. In some further related embodiment, r is 3 to 10. In some further related embodiment, r is 4 to 10. In some further related embodiment, r is 5 to 10. In some further related embodiment, r is 6 to 10. In some further related embodiment, r is 7 to 10. In some further related embodiment, r is 8 to 10. In some further related embodiment, r is 9 to 10. Moreover, in still further related embodiments, r is 0. In still some further embodiment, s is 1 to 10. In still some further embodiment, s is 2 to 10. In still some further embodiment, s is 3 to 10. In still some further embodiment, s is 4 to 10. In still some further embodiment, s is 5 to 10. In still some further embodiment, s is 6 to 10. In still some further embodiment, s is 7 to 10. In still some further embodiment, s is 8 to 10. In still some further embodiment, s is 9 to 10. $R^{1A}$, $R^{1B}$ and $R^2$ may be any of the embodiments described above (e.g., $R^{1A}$ and $R^{1B}$ maybe isopropyl, $R^2$ maybe hydrogen or unsubstituted $C_1$-$C_2$ alkyl).

In some embodiment, q is 0 to 7. In some related embodiment, q is 1 to 7. In some related embodiment, q is 2 to 7. In some related embodiment, q is 3 to 7. In some related embodiment, q is 4 to 7. In some related embodiment, q is 5 to 7. In some related embodiment, q is 6 to 7. Moreover, in still further related embodiments, q is 0. In some further related embodiment, r is 0 to 10. In some further related embodiment, r is 1 to 10. In some further related embodiment, r is 2 to 10. In some further related embodiment, r is 3 to 10. In some further related embodiment, r is 4 to 10. In some further related embodiment, r is 5 to 10. In some further related embodiment, r is 6 to 10. In some further related embodiment, r is 7 to 10. In some further related embodiment, r is 8 to 10. In some further related embodiment, r is 9 to 10. Moreover, in still further related embodiments, r is 0. In still some further embodiment, s is 1 to 10. In still some further embodiment, s is 2 to 10. In still some further embodiment, s is 3 to 10. In still some further embodiment, s is 4 to 10. In still some further embodiment, s is 5 to 10. In still some further embodiment, s is 6 to 10. In still some further embodiment, s is 7 to 10. In still some further embodiment, s is 8 to 10. In still some further embodiment, s is 9 to 10. $R^{1A}$, $R^{1B}$ and $R^2$ may be any of the embodiments described above (e.g., $R^{1A}$ and $R^{1B}$ maybe isopropyl, $R^2$ maybe hydrogen or unsubstituted $C_1$-$C_2$ alkyl).

In some embodiment, q is 0 to 6. In some related embodiment, q is 1 to 6. In some related embodiment, q is 2 to 6. In some related embodiment, q is 3 to 6. In some related embodiment, q is 4 to 6. In some related embodiment, q is 5 to 6. Moreover, in still further related embodiments, q is 0. In some further related embodiment, r is 0 to 10. In some further related embodiment, r is 1 to 10. In some further related embodiment, r is 2 to 10. In some further related embodiment, r is 3 to 10. In some further related embodiment, r is 4 to 10. In some further related embodiment, r is 5 to 10. In some further related embodiment, r is 6 to 10. In some further related embodiment, r is 7 to 10. In some further related embodiment, r is 8 to 10. In some further related embodiment, r is 9 to 10. Moreover, in still further related embodiments, r is 0. In still some further embodiment, s is 1 to 10. In still some further embodiment, s is 2 to 10. In still some further embodiment, s is 3 to 10. In still some further embodiment, s is 4 to 10. In still some further embodiment, s is 5 to 10. In still some further embodiment, s is 6 to 10. In still some further embodiment, s is 7 to 10. In still some further embodiment, s is 8 to 10. In still some further embodiment, s is 9 to 10. $R^{1A}$, $R^{1B}$ and $R^2$ may be any of the embodiments described above (e.g., $R^{1A}$ and $R^{1B}$ maybe isopropyl, $R^2$ maybe hydrogen or unsubstituted $C_1$-$C_2$ alkyl).

In some embodiment, q is 0 to 5. In some related embodiment, q is 1 to 5. In some related embodiment, q is 2 to 5. In some related embodiment, q is 3 to 5. In some related embodiment, q is 4 to 5. Moreover, in still further related embodiments, q is 0. In some further related embodiment, r is 0 to 10. In some further related embodiment, r is 1 to 10. In some further related embodiment, r is 2 to 10. In some further related embodiment, r is 3 to 10. In some further related embodiment, r is 4 to 10. In some further related embodiment, r is 5 to 10. In some further related embodiment, r is 6 to 10. In some further related embodiment, r is 7 to 10. In some further related embodiment, r is 8 to 10. In some further related embodiment, r is 9 to 10. Moreover, in still further related embodiments, r is 0. In still some further embodiment, s is 1 to 10. In still some further embodiment, s is 2 to 10. In still some further embodiment, s is 3 to 10. In still some further embodiment, s is 4 to 10. In still some further embodiment, s is 5 to 10. In still some further embodiment, s is 6 to 10. In still some further embodiment, s is 7 to 10. In still some further embodiment, s is 8 to 10. In still some further embodiment, s is 9 to 10. $R^{1A}$, $R^{1B}$ and $R^2$ may be any of the embodiments described above (e.g., $R^{1A}$ and $R^{1B}$ maybe isopropyl, $R^2$ maybe hydrogen or unsubstituted $C_1$-$C_2$ alkyl).

In some embodiment, q is 0 to 4. In some related embodiment, q is 1 to 4. In some related embodiment, q is 2 to 4. In some related embodiment, q is 3 to 4. Moreover, in still further related embodiments, q is 0. In some further related embodiment, r is 0 to 10. In some further related embodiment, r is 1 to 10. In some further related embodiment, r is 2 to 10. In some further related embodiment, r is 3 to 10. In some further related embodiment, r is 4 to 10. In some further related embodiment, r is 5 to 10. In some further related embodiment, r is 6 to 10. In some further related embodiment, r is 7 to 10. In some further related embodiment, r is 8 to 10. In some further related embodiment, r is 9 to 10. Moreover, in still further related embodiments, r is 0. In still some further embodiment, s is 1 to 10. In still some further embodiment, s is 2 to 10. In still some further embodiment, s is 3 to 10. In still some further embodiment, is 4 to 10. In still some further embodiment, s is 5 to 10. In still some further embodiment, s is 6 to 10. In still some further embodiment, s is 7 to 10. In still some further embodiment, s is 8 to 10. In still some further embodiment, s is 9 to 10. $R^{1A}$, $R^{1B}$ and $R^2$ may be any of the embodiments described above (e.g., $R^{1A}$ and $R^{1B}$ maybe isopropyl, $R^2$ maybe hydrogen or unsubstituted $C_1$-$C_2$ alkyl).

In some embodiment, q is 0 to 3. In some related embodiment, q is 1 to 3. In some related embodiment, q is 2 to 3. Moreover, in still further related embodiments, q is 0. In some further related embodiment, r is 0 to 10. In some further related embodiment, r is 1 to 10. In some further related embodiment, r is 2 to 10. In some further related embodiment, r is 3 to 10. In some further related embodiment, r is 4 to 10. In some further related embodiment, r is 5 to 10. In some further related embodiment, r is 6 to 10. In some further related embodiment, r is 7 to 10. In some further related embodiment, r is 8 to 10. In some further related embodiment, r is 9 to 10. Moreover, in still further related embodiments, r is 0. In still some further embodiment, s is 1 to 10. In still some further embodiment, s is 2 to 10. In still some further embodiment, s is 3 to 10. In still some further embodiment, s is 4 to 10. In still some further embodiment, s is 5 to 10. In still some further embodiment, s is 6 to 10. In still some further embodiment, s is 7 to 10. In still some further embodiment, s is 8 to 10. In still some further embodiment, s is 9 to 10. $R^{1A}$, $R^{1B}$ and $R^2$ may be any of the embodiments described above (e.g., $R^{1A}$ and $R^{1B}$ maybe isopropyl, $R^2$ maybe hydrogen or unsubstituted $C_1$-$C_2$ alkyl).

In some embodiment, q is 0 to 2. In some related embodiment, q is 1 to 2. Moreover, in still further related embodiments, q is 0. In some further related embodiment, r is 0 to 10. In some further related embodiment, r is 1 to 10. In some further related embodiment, r is 2 to 10. In some further related embodiment, r is 3 to 10. In some further related embodiment, r is 4 to 10. In some further related embodiment, r is 5 to 10. In some further related embodiment, r is 6 to 10. In some further related embodiment, r is 7 to 10. In some further related embodiment, r is 8 to 10. In some further related embodiment, r is 9 to 10. Moreover, in still further related embodiments, r is 0. In still some further embodiment, s is 1 to 10. In still some further embodiment, s is 2 to 10. In still some further embodiment, s is 3 to 10. In still some further embodiment, is 4 to 10. In still some further embodiment, s is 5 to 10. In still some further embodiment, s is 6 to 10. In still some further embodiment, s is 7 to 10. In still some further embodiment, s is 8 to 10. In still some further embodiment, s is 9 to 10 $R^{1A}$, $R^{1B}$ and $R^2$ may be any of the embodiments described above (e.g., $R^{1A}$ and $R^{1B}$ maybe isopropyl, $R^2$ maybe hydrogen or unsubstituted $C_1$-$C_2$ alkyl).

In some embodiments of the compound of formula (I), or embodiments thereof provided herein, where $R^{1A}$ and $R^{1B}$ are isopropyl, and $R^2$ is hydrogen, the symbol n is 1 or 3. In other embodiments, where $R^{1A}$ is hydrogen, $R^{1B}$ has the structure of formula (IV) and $R^2$ is hydrogen, the symbol n is 1 or 3. In some embodiments, where $R^{1A}$ is hydrogen, $R^{1B}$ has the structure of formula (V) and $R^2$ is hydrogen, the symbol n is 1 or 3. In some embodiments, where $R^{1A}$ is hydrogen, $R^{1B}$ has the structure of formula (VI) and $R^2$ is hydrogen, the symbol n is 1 or 3. In some embodiments, where $R^{1A}$ has the formula of structure (VI), $R^{1B}$ has the structure of formula (VII) and $R^2$ is hydrogen, the symbol n is 1 or 3. In some embodiments, where $R^{1A}$ and $R^{1B}$ have the formula of structure (VII) and $R^2$ is hydrogen, the symbol n is 1 or 3. In other embodiments, where $R^{1A}$ is hydrogen, $R^{1B}$ is phenyl and $R^2$ is hydrogen, the symbol n is 1 or 3. In other embodiments, where $R^{1A}$ is hydrogen, $R^{1B}$ is 6 membered cycloalkyl and $R^2$ is hydrogen, the symbol n is 1 or 3.

In another aspect, an aqueous composition including the compounds provided herein (e.g., compounds having the structure of formula (I), (II), or (III)) including embodiments thereof are provided. The aqueous composition provided herein may further include a plurality of different surfactants. The surfactants provided herein may be any appropriate surfactant useful in the field of enhanced oil recovery. Where the aqueous composition includes a plurality of different surfactants the aqueous composition may include a surfactant blend. A "surfactant blend" as provided herein is a mixture of a plurality of surfactant types. In some embodiments, the surfactant blend includes a first surfactant type, a second surfactant type or a third surfactant type. The first, second and third surfactant type may be independently different (e.g. anionic or cationic surfactants; or two anionic surfactants having a different hydrocarbon chain length but are otherwise the same). Therefore, a person having ordinary skill in the art will immediately recognize that the terms "surfactant" and "surfactant type(s)" have the same meaning and can be used interchangeably. In some embodiments, the plurality of different surfactants includes an anionic surfactant, a non-ionic surfactant, a zwitterionic surfactant or a cationic surfactant. In some embodiments, the surfactant is an anionic surfactant, a non-ionic surfactant, or a cationic surfactant. In other embodiments, the co-surfactant is a zwitterionic surfactant. "Zwitterionic" or "zwitterion" as used herein refers to a neutral molecule with a positive (or cationic) and a negative (or anionic) electrical charge at different locations within the same molecule. Examples for zwitterionics are without limitation betains and sultains.

The surfactant provided herein may be any appropriate anionic surfactant. In some embodiments, the surfactant is an anionic surfactant. In some embodiments, the anionic surfactant is an anionic surfactant blend. Where the anionic surfactant is an anionic surfactant blend the aqueous composition includes a plurality (i.e. more than one) of anionic surfactant types. In some embodiments, the anionic surfactant is an alkoxy carboxylate surfactant, an alkoxy sulfate surfactant, an alkoxy sulfonate surfactant, an alkyl sulfonate surfactant, an aryl sulfonate surfactant or an olefin sulfonate surfactant. An "alkoxy carboxylate surfactant" as provided herein is a compound having an alkyl or aryl attached to one or more alkoxylene groups (typically —$CH_2$—CH(ethyl)-O—, —$CH_2$—CH(methyl)-O—, or —$CH_2$—$CH_2$—O—) which, in turn is attached to —$COO^-$ or acid or salt thereof including metal cations such as sodium. In some embodiments, the alkoxy carboxylate surfactant has the formula:

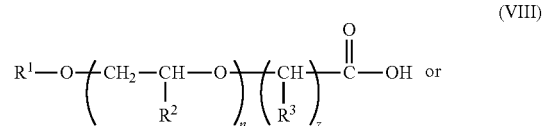

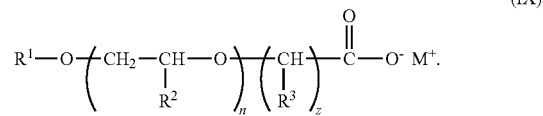

In formula (VIII) or (IX) $R^1$ is substituted or unsubstituted $C_8$-$C_{150}$ alkyl or substituted or unsubstituted aryl, $R^2$ is independently hydrogen or unsubstituted $C_1$-$C_6$ alkyl, $R^3$ is independently hydrogen or unsubstituted $C_1$-$C_6$ alkyl, the symbol n is an integer from 2 to 210, z is an integer from 1 to 6 and $M^+$ is a monovalent, divalent or trivalent cation. In some embodiments, $R^1$ is unsubstituted linear or branched $C_8$-$C_{36}$ alkyl. In some embodiments, $R^1$ is $(C_6H_5$—$CH_2CH_2)_3C_6H_2$-(TSP), $(C_6H_5$—$CH_2CH_2)_2C_6H_3$— (DSP), $(C_6H_5$—$CH_2CH_2)_1$ $C_6H_4$— (MSP), or substituted or unsubstituted naphthyl. In some embodiments, the alkoxy carboxylate is $C_{28}$-25PO-25EO-carboxylate (i.e. unsubstituted $C_{28}$ alkyl attached to 25 —$CH_2$—CH(methyl)-O-linkers, attached in turn to 25 —$CH_2$—$CH_2$—O— linkers, attached in turn to —$OOO^-$ or acid or salt thereof including metal cations such as sodium).

In some embodiments, the surfactant is an alkoxy sulfate surfactant. An alkoxy sulfate surfactant as provided herein is a surfactant having an alkyl or aryl attached to one or more alkoxylene groups (typically —$CH_2$—CH(ethyl)-O—, —$CH_2$—CH(methyl)-O—, or —$CH_2$—$CH_2$—O—) which, in turn is attached to —$SO_3^-$ or acid or salt thereof including metal cations such as sodium. In some embodiment, the alkoxy sulfate surfactant has the formula $R^A$—$(BO)_e$—$(PO)_f$-$(EO)_g$—$SO_3^-$ or acid or salt (including metal cations such as sodium) thereof, wherein $R^A$ is $C_8$-$C_{30}$ alkyl, BO is —$CH_2$—CH(ethyl)-O—, PO is —$CH_2$—CH(methyl)-O—, and EO is —$CH_2$—$CH_2$—O—. The symbols e, f and g are integers from 0 to 25 wherein at least one is not zero. In some embodiment, the alkoxy sulfate surfactant is $C_{15}$-13PO-sulfate (i.e. an unsubstituted $C_{15}$ alkyl attached to 13 —$CH_2$—CH(methyl)-O— linkers, in turn attached to —$SO_3^-$ or acid or salt thereof including metal cations such as sodium).

In other embodiments, the alkoxy sulfate surfactant has the formula

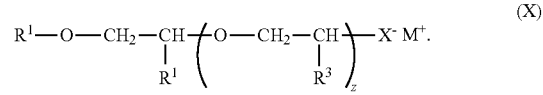

In formula (X) $R^1$ and $R^2$ are independently substituted or unsubstituted $C_8$-$C_{150}$ alkyl or substituted or unsubstituted aryl. $R^3$ is independently hydrogen or unsubstituted $C_1$-$C_6$ alkyl. z is an integer from 2 to 210. $X^-$ is

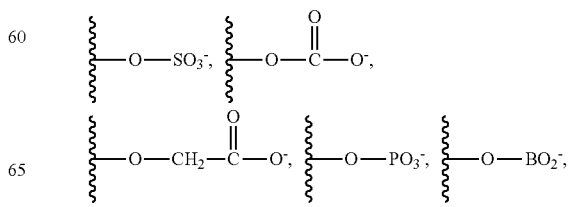

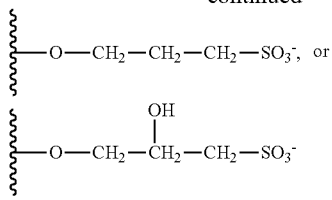

and M+ is a monovalent, divalent or trivalent cation. In some embodiments, $R^1$ is branched unsubstituted $C_8$-$C_{150}$. In other embodiments, $R^1$ is branched or linear unsubstituted $C_{12}$-$C_{100}$ alkyl, $(C_6H_5—CH_2CH_2)_3C_6H_2$-(TSP), $(C_6H_5—CH_2CH_2)_2C_6H_3—$ (DSP), $(C_6H_5—CH_2CH_2)_1C_6H_4—$ (MSP), or substituted or unsubstituted naphthyl. In some embodiments, the alkoxy sulfate is $C_{16}$-$C_{16}$-epoxide-15PO-10EO-sulfate (i.e. a linear unsubstituted $C_{16}$ alkyl attached to an oxygen, which in turn is attached to a branched unsubstituted $C_{16}$ alkyl, which in turn is attached to 15 —CH$_2$—CH (methyl)-O— linkers, in turn attached to 10 —CH$_2$—CH$_2$—O— linkers, in turn attached to —SO$_3^-$ or acid or salt thereof including metal cations such as sodium.

The alkoxy sulfate surfactant provided herein may be an aryl alkoxy sulfate surfactant. An aryl alkoxy surfactant as provided herein is an alkoxy surfactant having an aryl attached to one or more alkoxylene groups (typically —CH$_2$—CH(ethyl)-O—, —CH$_2$—CH(methyl)-O—, or —CH$_2$—CH$_2$—O—) which, in turn is attached to —SO$_3^-$ or acid or salt thereof including metal cations such as sodium. In some embodiments, the aryl alkoxy sulfate surfactant is $(C_6H_5—CH_2CH_2)_3C_6H_2$-7PO-10EO-sulfate (i.e. tristyrylphenol attached to 7 —CH$_2$—CH(methyl)-O— linkers, in turn attached to 10 —CH$_2$—CH$_2$—O— linkers, in turn attached to —SO$_3^-$ or acid or salt thereof including metal cations such as sodium).

In some embodiments, the surfactant is an unsubstituted alkyl sulfate or an unsubstituted alkyl sulfonate surfactant. An alkyl sulfate surfactant as provided herein is a surfactant having an alkyl group attached to -O—SO$_3^-$ or acid or salt thereof including metal cations such as sodium. An alkyl sulfonate surfactant as provided herein is a surfactant having an alkyl group attached to —SO$_3^-$ or acid or salt thereof including metal cations such as sodium. In some embodiments, the surfactant is an unsubstituted aryl sulfate surfactant or an unsubstituted aryl sulfonate surfactant. An aryl sulfate surfactant as provided herein is a surfactant having an aryl group attached to —O—SO$_3^-$ or acid or salt thereof including metal cations such as sodium. An aryl sulfonate surfactant as provided herein is a surfactant having an aryl group attached to —SO$_3^-$ or acid or salt thereof including metal cations such as sodium. In some embodiments, the surfactant is an alkyl aryl sulfonate. Non-limiting examples of alkyl sulfate surfactants, aryl sulfate surfactants, alkyl sulfonate surfactants, aryl sulfonate surfactants and alkyl aryl sulfonate surfactants useful in the embodiments provided herein are alkyl aryl sulfonates (ARS) (e.g. alkyl benzene sulfonate (ABS)), alkane sulfonates, petroleum sulfonates, and alkyl diphenyl oxide (di)sulfonates. Additional surfactants useful in the embodiments provided herein are alcohol sulfates, alcohol phosphates, alkoxy phosphate, sulfosuccinate esters, alcohol ethoxylates, alkyl phenol ethoxylates, quaternary ammonium salts, betains and sultains.

The surfactant as provided herein may be an olefin sulfonate surfactant. In some embodiments, the olefin sulfonate surfactant is an internal olefin sulfonate (IOS) or an alpha olefin sulfonate (AOS). In some embodiments, the olefin sulfonate surfactant is a $C_{10}$-$C_{30}$ (IOS). In some further embodiments, the olefin sulfonate surfactant is $C_{15}$-$C_{18}$ IOS. In other embodiments, the olefin sulfonate surfactant is $C_{19}$-$C_{28}$ IOS. Where the olefin sulfonate surfactant is $C_{15}$-$C_{18}$ IOS, the olefin sulfonate surfactant is a mixture (combination) of $C_{15}$, $C_{16}$, $C_{17}$ and $C_{18}$ alkene, wherein each alkene is attached to a –SO$_3^-$ or acid or salt thereof including metal cations such as sodium. Likewise, where the olefin sulfonate surfactant is $C_{19}$-$C_{28}$ IOS, the olefin sulfonate surfactant is a mixture (combination) of $C_{19}$, $C_{20}$, $C_{21}$ $C_{22}$, $C_{23}$, $C_{24}$, $C_{25}$, $C_{26}$, $C_{27}$ and $C_{28}$ alkene, wherein each alkene is attached to a –SO$_3^-$ or acid or salt thereof including metal cations such as sodium. As mentioned above, the aqueous composition provided herein may include a plurality of surfactants (i.e. a surfactant blend). In some embodiments, the surfactant blend includes a first olefin sulfonate surfactant and a second olefin sulfonate surfactant. In some further embodiments, the first olefin sulfonate surfactant is $C_{15}$-$C_{18}$ IOS and the second olefin sulfonate surfactant is $C_{19}$-$C_{28}$ IOS.

Useful surfactants are disclosed, for example, in U.S. Pat. Nos. 3,811,504, 3,811,505, 3,811,507, 3,890,239, 4,463,806, 6,022,843, 6,225,267, 7,629,299; WIPO Patent Application WO/2008/079855, WO/2012/027757 and WO/2011/094442; as well as U.S. Patent Application Nos. 2005/0199395, 2006/0185845, 2006/018486, 2009/0270281, 2011/0046024, 2011/0100402, 2011/0190175, 2007/0191633, 2010/004843. 2011/0201531, 2011/0190174, 2011/0071057, 2011/0059873, 2011/0059872, 2011/0048721, 2010/0319920, and 2010/0292110. Additional useful surfactants are surfactants known to be used in enhanced oil recovery methods, including those discussed in D. B. Levitt, A. C. Jackson, L. Britton and G. A. Pope, "Identification and Evaluation of High-Performance EOR Surfactants," SPE 100089, conference contribution for the SPE Symposium on Improved Oil Recovery Annual Meeting, Tulsa, Okla., Apr. 24-26, 2006.

A person having ordinary skill in the art will immediately recognize that many surfactants are commercially available as blends of related molecules (e.g. IOS and ABS surfactants). Thus, where a surfactant is present within a composition provided herein, a person of ordinary skill would understand that the surfactant may be a blend of a plurality of related surfactant molecules (as described herein and as generally known in the art).

In some embodiment, the total surfactant concentration (i.e. the total amount of all surfactant types within the aqueous compositions and emulsion compositions provided herein) in is from about 0.05% w/w to about 10% w/w. In other embodiments, the total surfactant concentration in the aqueous composition is from about 0.25% w/w to about 10% w/w. In other embodiments, the total surfactant concentration in the aqueous composition is about 0.5% w/w. In other embodiments, the total surfactant concentration in the aqueous composition is about 1.0% w/w. In other embodiments, the total surfactant concentration in the aqueous composition is about 1.25% w/w. In other embodiments, the total surfactant concentration in the aqueous composition is about 1.5% w/w. In other embodiments, the total surfactant concentration in the aqueous composition is about 1.75% w/w. In other embodiments, the total surfactant concentration in the aqueous composition is about 2.0% w/w. In other embodiments, the total surfactant concentration in the aqueous composition is about 2.5% w/w. In other embodiments, the total surfactant concentration in the aqueous composition is about 3.0% w/w. In other embodiments, the total surfactant concentration in the aqueous composition is about 3.5% w/w. In other embodiments, the total surfactant concentration in the aqueous composition is about 4.0% w/w. In other embodiments, the total surfactant concentration in the aqueous composition is about 4.5% w/w. In other embodiments, the total surfactant concentration in the aqueous composition is about 5.0% w/w. In other embodiments, the total surfactant concentration in the aqueous composition is about 5.5% w/w. In other embodiments, the total surfactant concentration in the aqueous composition is about 6.0% w/w. In other embodiments, the total surfactant concentration in the aqueous composition is about 6.5% w/w. In other embodiments, the total surfactant concentration in the aqueous composition is about 7.0% w/w. In other embodiments, the total surfactant concentration in the aqueous composition is about 7.5% w/w. In other embodiments, the total surfactant concentration in the aqueous composition is about 8.0% w/w. In other embodiments, the total surfactant concentration in the aqueous composition is about 9.0% w/w. In other embodiments, the total surfactant concentration in the aqueous composition is about 10% w/w.

In some embodiments, the compound (e.g., compound of formula (I), (II), or (III)) is present in an amount sufficient to increase the solubility of the surfactant in the aqueous composition relative to the absence of the compound. In other words, in the presence of a sufficient amount of the compound, the solubility of the surfactant in the aqueous composition is higher than in the absence of the compound. In other embodiments, the compound is present in an amount sufficient to increase the solubility of the surfactant in the aqueous composition relative to the absence of the compound. Thus, in the presence of a sufficient amount of the compound the solubility of the surfactant in the aqueous composition is higher than in the absence of the compound.

In some embodiments, the compound (e.g., compound of formula (I), (II), or (III)) is present in an amount sufficient to decrease the adsorption of the surfactant to the solid material in a petroleum reservoir relative to the absence of the compound. In other words, in the presence of a sufficient amount of the compound, the adsorption of the surfactant to the solid material in a petroleum reservoir is lower than in the absence of the compound. In other embodiments, the compound is present in an amount sufficient to decrease the adsorption of the surfactant to the solid material in a petroleum reservoir relative to the absence of the compound. Thus, in the presence of a sufficient amount of the compound the adsorption of the surfactant to the solid material in a petroleum reservoir is lower than in the absence of the compound.

In some embodiments, the compound (e.g., compound of formula (I), (II), or (III)) is present from about 0.05% w/w to about 10% w/w. In some embodiments, the compound is present from about 0.1% w/w to about 10% w/w. In other embodiments, the compound is present from about 0.5% w/w to about 10% w/w. In some embodiments, the compound is present from about 1% w/w to about 10% w/w. In other embodiments, the compound is present from about 1.5% w/w to about 10% w/w. In some embodiments, the compound is present from about 2% w/w to about 10% w/w. In other embodiments, the compound is present from about 2.5% w/w to about 10% w/w. In some embodiments, the compound is present from about 3% w/w to about 10% w/w. In other embodiments, the compound is present from about 3.5% w/w to about 10% w/w. In some embodiments, the compound is present from about 4% w/w to about 10% w/w. In other embodiments, the compound is present from about 4.5% w/w to about 10% w/w. In some embodiments, the compound is present from about 5% w/w to about 10% w/w. In other embodiments, the compound is present from about 5.5% w/w to about 10% w/w. In some embodiments, the compound is present from about 6% w/w to about 10% w/w. In other embodiments, the compound is present from about 6.5% w/w to about 10% w/w. In some embodiments, the compound is present from about 7% w/w to about 10% w/w. In other embodiments, the compound is present from about 7.5% w/w to about 10% w/w. In some embodiments, the compound is present from about 8% w/w to about 10% w/w. In other embodiments, the compound is present from about 8.5% w/w to about 10% w/w. In some embodiments, the compound is present from about 9% w/w to about 10% w/w. In other embodiments, the compound is present from about 9.5% w/w to about 10% w/w. In some embodiments, the compound is present at about 2% w/w. In other embodiments, the compound is present at about 0.5% w/w.

In one embodiment, the aqueous composition further includes a viscosity enhancing water-soluble polymer. In one embodiment, the viscosity enhancing water-soluble polymer may be a biopolymer such as xanthan gum or scleroglucan, a synthetic polymer such as polyacrylamide, hydrolyzed polyacrylamide or co-polymers of acrylamide and acrylic acid, 2-acrylamido 2-methyl propane sulfonate or N-vinyl pyrrolidone, a synthetic polymer such as polyethylene oxide, or any other high molecular weight polymer soluble in water or brine. In one embodiment, the viscosity enhancing water-soluble polymer is polyacrylamide or a co-polymer of polyacrylamide. In one embodiment, the viscosity enhancing water-soluble polymer is a partially (e.g. 20%, 25%, 30%, 35%, 40%, 45%) hydrolyzed anionic polyacrylamide. In some further embodiment, the viscosity enhancing water-soluble polymer has a molecular weight of approximately about $8 \times 10^6$. In some other further embodiment, the viscosity enhancing water-soluble polymer has a molecular weight of approximately about $18 \times 10^6$. Non-limiting examples of commercially available polymers useful for the invention including embodiments provided herein are Florpaam 3330S and Florpaam 3360S.

In some embodiments, the compound (e.g., compound of formula (I), (II), or (III)) is present in an amount sufficient to increase the solubility of the viscosity enhancing water-soluble polymer in the aqueous composition relative to the absence of the compound. In other words, in the presence of a sufficient amount of the compound, the solubility of the viscosity enhancing water-soluble polymer in the aqueous composition is higher than in the absence of the compound. In other embodiments, the compound is present in an amount sufficient to increase the solubility of the viscosity enhancing water-soluble polymer in the aqueous composition relative to the absence of the compound. Thus, in the presence of a sufficient amount of the compound the solubility of the viscosity enhancing water-soluble polymer in the aqueous composition is higher than in the absence of the compound.

The aqueous composition provided herein may further include a gas. Thus, in some embodiment, the aqueous composition further includes a gas. For instance, the gas may be combined with the aqueous composition to reduce its mobility by decreasing the liquid flow in the pores of the solid material (e.g. rock). In some embodiments, the gas may be supercritical carbon dioxide, nitrogen, natural gas or mixtures of these and other gases.

In some embodiments, the aqueous composition further includes an alkali agent. An alkali agent as provided herein is a basic, ionic salt of an alkali metal (e.g. lithium, sodium, potassium) or alkaline earth metal element (e.g. magnesium, calcium, barium, radium). In some embodiments, the alkali agent is NaOH, KOH, LiOH, $Na_2CO_3$, $NaHCO_3$, Na-metaborate, Na silicate, Na orthosilicate, or $NH_4OH$. The aqueous composition may include seawater, or fresh water from an aquifer, river or lake. In some embodiments, the aqueous composition includes hard brine or soft brine. In some further embodiments, the water is soft brine. In some further embodiments, the water is hard brine. Where the aqueous composition includes soft brine, the aqueous composition may include an alkaline agent. In soft brine the alkaline agent provides for enhanced soap generation from the oils, lower surfactant adsorption to the solid material (e.g. rock) in the reservoir and increased solubility of viscosity enhancing water soluble polymers. The alkali agent is present in the aqueous composition at a concentration from about 0.1% w/w to about 10% w/w.

In some embodiments, the aqueous composition further includes an alkylamine or arylamine. In some embodiments, the alkylamine is diisopropylamine (DIPA). In other embodiments, the alkylamine is an alkylpolyamine. In some embodiments, the alkylpolyamine is dimethylaminopropylamine (DMAPA), triethylenetetramine (TETA) or diethylenetriamine (DETA). In some embodiments, the alkylpolyamine is dimethylaminopropylamine. In other embodiments, the alkylpolyamine is triethylenetetramine. In some embodiments, the alkylpolyamine is diethylenetriamine. Diisopropylamine refers, in the customary sense, to CAS Registry No 108-18-9 and appropriate salts thereof. Dimethylaminopropylamine refers, in the customary sense, to CAS Registry No. 109-55-7 and appropriate salts thereof. Triethylenetetramine refers, in the customary sense, to CAS Registry No. 112-24-3 and appropriate salts thereof. Diethylenetriamine refers, in the customary sense, to CAS Registry No. 111-40-0 and appropriate salts thereof. In some embodiments, the aqueous composition further includes an arylamine. In some embodiments, the arylamine is aniline.

As described herein the aqueous compositions provided herein include water, a surfactant and a compound having the formula (I), (II), or (III). In one embodiment, the aqueous composition includes water, a first surfactant, wherein said first surfactant is an alkoxy sulfate surfactant having the formula $R^A$—$(BO)_e$—$(PO)_f$—$(EO)_g$—$SO_3^-$, wherein $R^A$ is unsubstituted $C_{13}$ alkyl, e and g are 0 and f is 13; present at 0.5% w/w; a second surfactant, wherein the second surfactant is the olefin sulfonate surfactant $C_{20}$-$C_{24}$ IOS, present at 0.5% (w/w); and a compound of formula (I), wherein $R^{1A}$ and $R^{1B}$ are isopropyl, $R^2$ is hydrogen, and the symbol n is 1; present at 2% (w/w). The compound of formula (I), wherein $R^{1A}$ and $R^{1B}$ are isopropyl, $R^2$ is hydrogen, and the symbol n is 1 may be referred to herein as DIPA-1EO.

In another embodiment, the aqueous composition includes water, a first surfactant, wherein said first surfactant is an alkoxy sulfate surfactant having the formula $R^A$—$(BO)_e$—$(PO)_f$—$(EO)_g$—$SO_3^-$, wherein $R^A$ is unsubstituted $C_{28}$ alkyl, e is 0, f is 25 and g is 10; present at 0.25% w/w; a second surfactant, wherein the second surfactant is the olefin sulfonate surfactant $C_{20}$-$C_{24}$ IOS, present at 0.25% (w/w); and a compound of formula (I), wherein $R^{1A}$ and $R^{1B}$ are isopropyl, $R^2$ is hydrogen, and the symbol n is 3; present at 0.5% (w/w). The compound of formula (I), wherein $R^{1A}$ and $R^{1B}$ are isopropyl, $R^2$ is hydrogen, and the symbol n is 3 may be referred to herein as DIPA-3EO.

In another aspect, an emulsion composition is provided. The emulsion composition includes an unrefined petroleum, water, a surfactant and a compound having the formula:

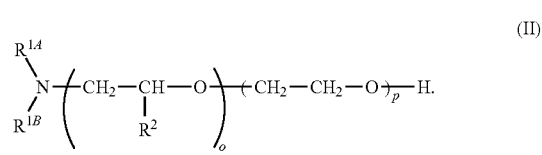
(I)

In formula (I) $R^{1A}$ and $R^{1B}$ are independently hydrogen, unsubstituted $C_1$-$C_8$ alkyl, unsubstituted cycloalkyl, unsubstituted heterocycloalkyl, unsubstituted aryl, unsubstituted heteroaryl, $C_1$-$C_6$ alkylamine or

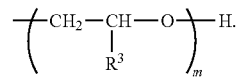

$R^2$ and $R^3$ are independently hydrogen or unsubstituted $C_1$-$C_2$ alkyl. The symbol n is an integer from 1 to 30 and m is an integer from 1 to 30.

In some embodiments, the emulsion composition includes a compound having the formula:

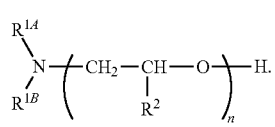
(II)

In formula (II) $R^{1A}$ and $R^{1B}$ are defined as above (e.g. hydrogen, $C_3$ alkyl, or $C_1$-$C_6$ alkylamine), $R^2$ is methyl or ethyl, o is an integer from 0 to 15 and p is an integer from 1 to 10.

In some embodiments, the emulsion composition is a microemulsion. A "microemulsion" as referred to herein is a thermodynamically stable mixture of oil, water and surfactants that may also include additional components such as the compounds provided herein including embodiments thereof, electrolytes, alkali and polymers. In contrast, a "macroemulsion" as referred to herein is a thermodynamically unstable mixture of oil and water that may also include additional components. The emulsion composition provided herein may be an oil-in-water emulsion, wherein the surfactant forms aggregates (e.g. micelles) where the hydrophilic part of the surfactant molecule contacts the aqueous phase of the emulsion and the lipophilic part contacts the oil phase of the emulsion. Thus, in some embodiments, the surfactant forms part of the aqueous part of the emulsion. And in other embodiments, the surfactant forms part of the oil phase of the emulsion. In yet another embodiment, the surfactant forms part of an interface between the aqueous phase and the oil phase of the emulsion.

In some embodiments, the compound provided herein including embodiments thereof (e.g., compound of formula (I), (II), or (III)) is present in an amount sufficient to increase the solubility of the surfactant in the emulsion composition relative to the absence of the compound. In other words, in the presence of a sufficient amount of the compound, the solubility of the surfactant in the emulsion composition is higher than in the absence of the compound. In other embodiments, the compound is present in an amount sufficient to increase the solubility of the surfactant in the emulsion composition relative to the absence of the compound. Thus, in the presence of a sufficient amount of the compound the solubility of the surfactant in the emulsion composition is higher than in the absence of the compound. In some embodiments, the compound is present in an amount sufficient to decrease the viscosity of the emulsion relative to the absence of the compound. In some embodiments, the compound provided herein including embodiments thereof (e.g., compound of formula (I), (II), or (III)) is present in an amount sufficient to decrease the viscosity of the microemulsion relative to the absence of the compound. In other embodiments, the microemulsion equilibrates faster in the presence of the compound than in the absence of the compound.

In some embodiments, the compound (e.g., compound of formula (I), (II), or (III)) is present in an amount sufficient to decrease the absorption of the surfactant to the solid material in a petroleum reservoir realtive to the absence of the compound. In other words, in the presence of a sufficient amount of the compound, the absorption of the surfactant to the solid material in a petroleum reservoir is lower than in the absence of the compound. In other embodiments, the compound is present in an amount sufficient to decrease the absorption of the surfactant to the solid material in a petroleum reservoir relative to the absence of the compound. Thus, in the presence of a sufficient amount of the compound the absorption of the surfactant to the solid material in a petroleum reservoir is lower than in the absence of the compound.

The emulsion composition provided herein includes an unrefined petroleum, water, a surfactant and a compound as described herein including embodiments thereof (e.g., a compound of formula (I), (II), or (III)). In some embodiments, the emulsion composition includes the components set forth in the aqueous composition provided above. Thus, in some embodiments, the emulsion composition includes a plurality of different surfactants. In other embodiments, the plurality of different surfactants includes an anionic surfactant, a non-ionic surfactant, a zwitterionic surfactant or a cationic surfactant. In some embodiments, the emulsion composition further includes an alkali agent. In other embodiments, the alkali agent is the alkali agent is NaOH, KOH, LiOH, $Na_2CO_3$, $NaHCO_3$, Na-metaborate, Na silicate, Na orthosilicate, Na acetate or $NH_4OH$. In some embodiments, the emulsion composition further includes a viscosity enhancing water soluble polymer. In some embodiments, the emulsion composition further includes a gas. In some embodiments, the emulsion composition further includes an alkylamine or arylamine. In some embodiments, the alkylamine is diisopropylamine. In some embodiments, the alkylamine is an alkylpolyamine. In some embodiments, the alkylpolyamine is dimethylaminopropylamine, triethylenetetramine or diethylenetriamine. In some embodiments, the arylamine is aniline.

III. Methods

In another aspect, a method of displacing an unrefined petroleum material in contact with a solid material is provided. The method includes contacting an unrefined petroleum material with an aqueous composition including water, a surfactant and a compound as provided herein including embodiments thereof (e.g., a compound of formula (I), (II), or (III)), wherein the unrefined petroleum material is in contact with a solid material. The unrefined petroleum material is allowed to separate from the solid material thereby displacing the unrefined petroleum material in contact with the solid material. In some embodiments, the method further includes contacting the solid material with the aqueous composition. The aqueous composition includes water, a surfactant and a compound as described herein. In other embodiments, the aqueous composition further includes a water-soluble polymer. In other embodiments, the aqueous composition further includes a gas. In other embodiments, the aqueous composition further includes an alkali agent. In some embodiments, the compound is present in an amount sufficient to increase the solubility of the surfactant relative to the absence of the compound.

In some embodiments, the aqueous composition is the aqueous composition as described above. Thus, the aqueous composition useful for the methods provided herein may include a plurality of different surfactants. In other embodiments, the plurality of different surfactants includes an anionic surfactant, a non-ionic surfactant, a zwitterionic surfactant or a cationic surfactant. In some embodiments, the emulsion composition further includes an alkali agent. In other embodiments, the alkali agent is the alkali agent is NaOH, KOH, LiOH, $Na_2CO_3$, $NaHCO_3$, Na-metaborate, Na silicate, Na orthosilicate, Na acetate or $NH_4OH$. In some embodiments, the emulsion composition further includes a viscosity enhancing water soluble polymer. In some embodiments, the emulsion composition further includes a gas. In some embodiments, the emulsion composition further includes an alkylamine or arylamine. In some embodiments, the alkylamine is diisopropylamine. In some embodiments, the alkylamine is an alkylpolyamine. In some embodiments, the alkylpolyamine is dimethylaminopropylamine, triethylenetetramine or diethylenetriamine. In some embodiments, the arylamine is aniline.

The solid material may be a natural solid material (i.e. a solid found in nature such as rock). The natural solid material may be found in a petroleum reservoir. In one embodiment, the method is an enhanced oil recovery method. In one embodiment, the natural solid material is rock or regolith. The natural solid material may be a geological formation such as elastics or carbonates. The natural solid material may be either consolidated or unconsolidated material or mixtures thereof. The unrefined petroleum material may be trapped or confined by "bedrock" above or below the natural solid material. The unrefined petroleum material may be found in fractured bedrock or porous natural solid material. In other embodiments, the regolith is soil.

In one embodiment, an emulsion forms after the contacting. The emulsion thus formed may be the emulsion composition as described above.

IV. Examples

Phase Behavior Procedures

Phase Behavior Screening: Phase behavior studies have been used to characterize chemicals for EOR. There are many benefits in using phase behavior as a screening method. Phase Behavior studies are used to determine: (1) the effect of electrolytes; (2) oil solubilization and IFT reduction, (3) microemulsion densities; (4) microemulsion viscosities; (5) coalescence times; (6) optimal co-solvent/alkali agent formulations; and/or (7) optimal properties for recovering oil from cores and reservoirs.

Thermodynamically stable phases can form with oil, water and aqueous mixtures. In situ generated soaps form micellar structures at concentrations at or above the critical micelle concentration (CMC). The emulsion coalesces into a separate phase at the oil-water interface and is referred to as a microemulsion. A microemulsion is a surfactant-rich distinct phase consisting of in situ generated soaps, oil and water and co-solvent, alkali agent and other components. This phase is thermodynamically stable in the sense that it will return to the same phase volume at a given temperature. Some workers in the past have added additional requirements, but for the purposes of this engineering study, the only requirement will be that the microemulsion is a thermodynamically stable phase.

The phase transition is examined by keeping all variables fixed except for the scanning variable. The scan variable is changed over a series of pipettes and may include, but is not limited to, salinity, temperature, chemical (co-solvent, alcohol, electrolyte), oil, which is sometimes characterized by its equivalent alkane carbon number (EACN), and co-solvent structure, which is sometimes characterized by its hydrophilic-lipophilic balance (HLB). The phase transition was first characterized by Winsor (1954) into three regions: Type I—excess oil phase, Type III—aqueous, microemulsion and oil phases, and the Type II—excess aqueous phase. The phase transition boundaries and some common terminology are described as follows: Type I to III—lower critical salinity, Type III to II—upper critical salinity, oil solubilization ratio (Vo/Vs), water solubilization ratio (Vw/Vs), the solubilization value where the oil and water solubilization ratios are equal is called the Optimum Solubilization Ratio (σ*), and the electrolyte concentration where the optimum solubilization ratio occurs is referred to as the Optimal Salinity (S*). Since no surfactant is added, the only surfactant present is the in-situ generated soap. For the purpose of calculating a solubilization ratio, one can assume a value for soap level using TAN (total acid number) and an approximate molecular weight for the soap.

Determining Interfacial Tension

Efficient use of time and lab resources can lead to valuable results when conducting phase behavior scans. A correlation between oil and water solubilization ratios and interfacial tension was suggested by Healy and Reed (1976) and a theoretical relationship was later derived by Chun Huh (1979). Lowest oil-water IFT occurs at optimum solubilization as shown by the Chun Huh theory. This is equated to an interfacial tension through the Chun Huh equation, where IFT varies with the inverse square of the solubilization ratio:

$$\gamma = \frac{C}{\sigma^2} \tag{1}$$

For most crude oils and microemulsions, C=0.3 is a good approximation. Therefore, a quick and convenient way to estimate IFT is to measure phase behavior and use the Chun-Huh equation to calculate IFT. The IFT between microemulsions and water and/or oil can be very difficult and time consuming to measure and is subject to larger errors, so using the phase behavior approach to screen hundreds of combinations of co-solvents, electrolytes, oil, and so forth is not only simpler and faster, but avoids the measurement problems and errors associated with measuring IFT especially of combinations that show complex behavior (gels and so forth) and will be screened out anyway. Once a good formulation has been identified, then it is still a good idea to measure IFT.

Equipment

Phase behavior experiments are created with the following materials and equipment.

Mass Balance: Mass balances are used to measure chemicals for mixtures and determine initial saturation values of cores.

Water Deionizer: Deionized (DI) water is prepared for use with all the experimental solutions using a Nanopure™ filter system. This filter uses a recirculation pump and monitors the water resistivity to indicate when the ions have been removed. Water is passed through a 0.45 micron filter to eliminate undesired particles and microorganisms prior to use.

Borosilicate Pipettes: Standard 5 mL borosilicate pipettes with 0.1 mL markings are used to create phase behavior scans as well as run dilution experiments with aqueous solutions. Ends are sealed using a propane and oxygen flame.

Pipette Repeater: An Eppendorf Repeater Plus® instrument is used for most of the pipetting. This is a handheld dispenser calibrated to deliver between 25 microliter and 1 ml increments. Disposable tips are used to avoid contamination between stocks and allow for ease of operation and consistency.

Propane-oxygen Torch: A mixture of propane and oxygen gas is directed through a Bernz-O-Matic flame nozzle to create a hot flame about ½ inch long. This torch is used to flame-seal the glass pipettes used in phase behavior experiments.

Convection Ovens: Several convection ovens are used to incubate the phase behaviors and core flood experiments at the reservoir temperatures. The phase behavior pipettes are primarily kept in Blue M and Memmert ovens that are monitored with mercury thermometers and oven temperature gauges to ensure temperature fluctuations are kept at a minimal between recordings. A large custom built flow oven was used to house most of the core flood experiments and enabled fluid injection and collection to be done at reservoir temperature.

pH Meter: An ORION research model 701/digital ion analyzer with a pH electrode is used to measure the pH of most aqueous samples to obtain more accurate readings. This is calibrated with 4.0, 7.0 and 10.0 pH solutions. For rough measurements of pH, indicator papers are used with several drops of the sampled fluid.

Phase Behavior Calculations

The oil and water solubilization ratios are calculated from interface measurements taken from phase behavior pipettes. These interfaces are recorded over time as the mixtures approached equilibrium and the volume of any macroemulsions that initially formed decreased or disappeared.

Phase Behavior Methodology

The methods for creating, measuring and recording observations are described in this section. Scans are made using a variety of electrolyte mixtures described below. Oil is added to most aqueous surfactant solutions to see if a microemulsion formed, how long it took to form and equilibrate if it formed, what type of microemulsion formed and some of its properties such as viscosity. However, the behavior of aqueous mixtures without oil added is also important and is also done in some cases to determine if the aqueous solution is clear and stable over time, becomes cloudy or separated into more than one phase.

Preparation of samples. Phase behavior samples are made by first preparing surfactant aqueous stock solutions and combining them with brine stock solutions in order to observe the behavior of the mixtures over a range of salinities.

Solution Preparation. Surfactant aqueous stock solutions are based on active weight-percent co-solvent. The masses of co-solvent, alkali agent and de-ionized water (DI) are measured out on a balance and mixed in glass jars using magnetic stir bars. The order of addition is recorded on a mixing sheet along with actual masses added and the pH of the final solution. Brine solutions are created at the necessary weight percent concentrations for making the scans.

Co-solvent Stock. The chemicals being tested are first mixed in a concentrated stock solution that usually consisted of co-solvent, alkali agent and/or polymer along with de-ionized water. The quantity of chemical added is calculated based on activity and measured by weight percent of total solution. Initial experiments are at about 1-3% co-solvent so that the volume of the middle microemulsion phase would be large enough for accurate measurements assuming a solubilization ratio of at least 10 at optimum salinity.

Polymer Stock. Often these stocks were quite viscous and made pipetting difficult so they are diluted with de-ionized water accordingly to improve ease of handling. Mixtures with polymer are made only for those co-solvent formulations that showed good behavior and merited additional study for possible testing in core floods. Consequently, scans including polymer are limited since they are done only as a final evaluation of compatibility with the co-solvent.

Pipetting Procedure. Phase behavior components are added volumetrically into 5 ml pipettes using an Eppendorf Repeater Plus or similar pipetting instrument. Co-solvent, alkali agent and brine stocks are mixed with DI water into labeled pipettes and brought to temperature before agitation. Almost all of the phase behavior experiments are initially created with a water oil ratio (WOR) of 1:1, which involves mixing 2 ml of the aqueous phase with 2 ml of the evaluated crude oil or hydrocarbon, and different WOR experiments are mixed accordingly. The typical phase behavior scan consisted of 10-20 pipettes, each pipette being recognized as a data point in the series.

Order of Addition. Consideration must be given to the addition of the components since the concentrations are often several folds greater than the final concentration. Therefore, an order is established to prevent any adverse effects resulting from co-solvent, alkali agent or polymer coming into direct contact with the concentrated electrolytes. The desired sample compositions are made by combining the stocks in the following order: (1) Electrolyte stock(s); (2) De-ionized water; (3) co-solvent stock; (4) alkali agent stock; (5) Polymer stock; and (6) Crude oil or hydrocarbon.

Initial Observations. Once the components are added to the pipettes, sufficient time is allotted to allow all the fluid to drain down the sides. Then aqueous fluid levels are recorded before the addition of oil. These measurements are marked on record sheets. Levels and interfaces are recorded on these documents with comments over several days and additional sheets are printed as necessary.

Sealing and Mixing. The pipettes are blanketed with argon gas to prevent the ignition of any volatile gas present by the flame sealing procedure. The tubes are then sealed with the propane-oxygen torch to prevent loss of additional volatiles when placed in the oven. Pipettes are arranged on the racks to coincide with the change in the scan variable. Once the phase behavior scan is given sufficient time to reach reservoir temperature (15-30 minutes), the pipettes are inverted several times to provide adequate mixing. Tubes are observed for low tension upon mixing by looking at droplet size and how uniform the mixture appeared. Then the solutions are allowed to equilibrate over time and interface levels are recorded to determine equilibration time and co-solvent/alkali agent performance.

Measurements and Observations. Phase behavior experiments are allowed to equilibrate in an oven that is set to the reservoir temperature for the crude oil being tested. The fluid levels in the pipettes are recorded periodically and the trend in the phase behavior observed over time. Equilibrium behavior is assumed when fluid levels ceased to change within the margin of error for reading the samples.

Fluid Interfaces. The fluid interfaces are the most crucial element of phase behavior experiments. From them, the phase volumes are determined and the solubilization ratios are calculated. The top and bottom interfaces are recorded as the scan transitioned from an oil-in-water microemulsion to a water-in-oil microemulsion. Initial readings are taken one day after initial agitation and sometimes within hours of agitation if coalescence appeared to happen rapidly. Measurements are taken thereafter at increasing time intervals (for example, one day, four days, one week, two weeks, one month and so on) until equilibrium is reached or the experiment is deemed unessential or uninteresting for continued observation.

V. Embodiments

Embodiment 1

A compound having the formula:

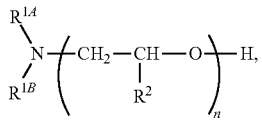

wherein
$R^{1A}$ and $R^{1B}$ are independently hydrogen, unsubstituted $C_1$-$C_8$ alkyl, unsubstituted cycloalkyl, unsubstituted heterocycloalkyl, unsubstituted aryl, unsubstituted heteroaryl, $C_1$-$C_6$ alkylamine or

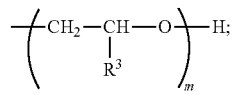

$R^2$ and $R^3$ are independently hydrogen or unsubstituted $C_1$-$C_2$ alkyl;
n is an integer from 1 to 30; and
m is an integer from 1 to 30.

Embodiment 2

The compound of embodiment 1, wherein $R^{1A}$ and $R^{1B}$ are independently unsubstituted $C_1$-$C_6$ alkyl.

Embodiment 3

The compound of any one of embodiments 1 or 2, wherein the number of total carbon atoms within $R^{1A}$ and $R^{1B}$ combined does not exceed 8.

Embodiment 4

The compound of any one of embodiments 1-3, wherein $R^{1A}$ and $R^{1B}$ are independently unsubstituted $C_1$-$C_4$ alkyl.

Embodiment 5

The compound of any one of embodiments 1-4, wherein $R^{1A}$ and $R^{1B}$ are unsubstituted isopropyl.

Embodiment 6

The compound of any one of embodiments 1-5, wherein n is an integer from 1 to 10.

Embodiment 7

The compound of one of embodiments 1-6, wherein n is an integer from 1 to 6.

Embodiment 8

The compound of one of embodiments 1-7, wherein $R^2$ is hydrogen and n is an integer from 1 to 3.

Embodiment 9

The compound of any one of embodiments 1-8, wherein m is an integer from 1 to 10.

Embodiment 10

The compound of any one of embodiments 1-9, wherein m is an integer from 1 to 6.

Embodiment 11

The compound of any one of embodiments 1-10, wherein $R^3$ is hydrogen and m is an integer from 1 to 3.

Embodiment 12

The compound of any one of embodiments 1-11, wherein $R^{1A}$ and $R^{1B}$ are independently hydrogen or $C_2$-$C_6$ alkylamine.

Embodiment 13

The compound of any one of embodiments 1-11, wherein $R^{1A}$ is hydrogen and $R^{1B}$ is $C_4$-$C_6$ alkylamine.

Embodiment 14

The compound of any one of embodiments 1-11, wherein $R^{1A}$ and $R^{1B}$ are independently $C_2$-$C_4$ alkylamine.

Embodiment 15

The compound of any one of embodiments 1-14, wherein said alkylamine is an alkylpolyamine.

Embodiment 16

The compound of any one of embodiments 1-11, wherein $R^{1A}$ is hydrogen and $R^{1B}$ is unsubstituted cycloalkyl.

Embodiment 17

The compound of embodiment 16, wherein $R^{1B}$ is 6 membered cycloalkyl.

Embodiment 18

The compound of any one of embodiments 1-11, wherein $R^{1A}$ is hydrogen and $R^{1B}$ is unsubstituted aryl.

Embodiment 19

The compound of embodiment 18, wherein $R^{1B}$ is phenyl.

Embodiment 20

The compound of embodiment 1, wherein said compound has the formula:

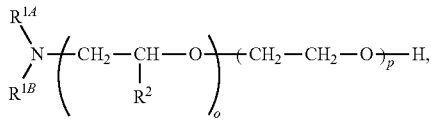

wherein
 $R^2$ is methyl or ethyl;
 o is an integer from 0 to 15; and
 p is an integer from 1 to 10.

Embodiment 21

The compound of embodiment 20, wherein $R^2$ is hydrogen, o is 0 and p is an integer from 1 to 6.

Embodiment 22

The compound of embodiment 1, wherein said compound has the formula:

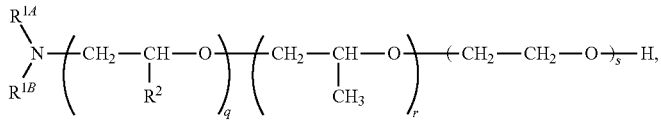

wherein
 $R^2$ is ethyl;
 q is an integer from 0 to 10;
 r is an integer from 0 to 10; and
 s is an integer from 1 to 10.

Embodiment 23

An aqueous composition comprising a compound of one of embodiments 1 to 22, water and a surfactant.

Embodiment 24

The aqueous composition of embodiment 23, further comprising a plurality of different surfactants.

Embodiment 25

The aqueous composition of embodiment 24, wherein said plurality of different surfactants comprises an anionic surfactant, a non-ionic surfactant, a zwitterionic surfactant or a cationic surfactant.

Embodiment 26

The aqueous composition of embodiment 25, wherein said anionic surfactant is an alkoxy carboxylate surfactant, an alkoxy sulfate surfactant, an alkoxy sulfonate surfactant, an alkyl sulfonate surfactant, an aryl sulfonate surfactant or an olefin sulfonate surfactant.

Embodiment 27

The aqueous composition of any one of embodiments 23-26, further comprising an alkali agent.

Embodiment 28

The aqueous composition of embodiment 27, wherein said alkali agent is NaOH, KOH, LiOH, $Na_2CO_3$, $NaHCO_3$, Na-metaborate, Na silicate, Na orthosilicate, Na acetate or $NH_4OH$.

Embodiment 29

The aqueous composition of any one of embodiments 23-28, wherein said compound is present in said aqueous composition in an amount sufficient to increase the solubility of said surfactant in said aqueous composition relative to the absence of said compound.

Embodiment 30

The aqueous composition of any one of embodiments 23-29, further comprising a viscosity enhancing water soluble polymer.

Embodiment 31

The aqueous composition of embodiment 30, wherein said viscosity enhancing water soluble polymer is polyacrylamide or a co-polymer of polyacrylamide.

Embodiment 32

The aqueous composition of any one of embodiments 23-31, further comprising a gas.

Embodiment 33

The aqueous composition of any one of embodiments 23-32, further comprising an alkylamine or arylamine.

Embodiment 34

The aqueous composition of embodiment 33, wherein said alkylamine is diisopropylamine.

Embodiment 35

The aqueous composition of embodiment 33, wherein said alkylamine is an alkylpolyamine.

Embodiment 36

The aqueous composition of embodiment 35, wherein said alkylpolyamine is dimethylaminopropylamine, triethylenetetramine or diethylenetriamine.

Embodiment 37

The aqueous composition of embodiment 33, wherein said arylamine is aniline.

Embodiment 38

An emulsion composition comprising an unrefined petroleum, water, a surfactant and a compound having the formula:

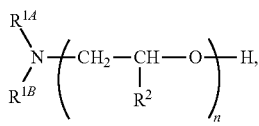

wherein
$R^{1A}$ and $R^{1B}$ are independently hydrogen, unsubstituted $C_1$-$C_8$ alkyl, unsubstituted cycloalkyl, unsubstituted heterocycloalkyl, unsubstituted aryl, unsubstituted heteroaryl, $C_1$-$C_6$ alkylamine or

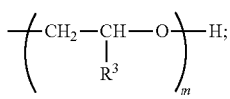

$R^2$ and $R^3$ are independently hydrogen or unsubstituted $C_1$-$C_2$ alkyl;
n is an integer from 1 to 30; and
m is an integer from 1 to 30.

Embodiment 39

The emulsion composition of embodiment 38, wherein said compound has the formula:

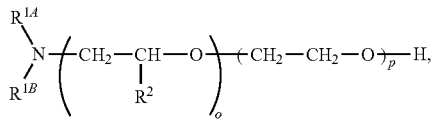

wherein
$R^2$ is methyl or ethyl;
o is an integer from 0 to 15; and
p is an integer from 1 to 10.

Embodiment 40

The emulsion composition of any one of embodiments 38-39, wherein said emulsion composition is a microemulsion.

Embodiment 41

The emulsion composition of any one of embodiments 38-40, wherein said compound is present in an amount sufficient to increase the solubility of said surfactant in said emulsion composition relative to the absence of said compound.

Embodiment 42

The emulsion composition of any one of embodiments 38-41, comprising a plurality of different surfactants.

Embodiment 43

The emulsion composition of embodiment 42, wherein said plurality of different surfactants comprises an anionic surfactant, a non-ionic surfactant, a zwitterionic surfactant or a cationic surfactant.

Embodiment 44

The emulsion composition of any one of embodiments 38-43, wherein said emulsion composition further comprises an alkali agent.

Embodiment 45

The emulsion composition of embodiment 44, wherein said alkali agent is the alkali agent is NaOH, KOH, LiOH, $Na_2CO_3$, $NaHCO_3$, Na-metaborate, Na silicate, Na orthosilicate, Na acetate or $NH_4OH$.

Embodiment 46

The emulsion composition of any one of embodiments 38-45, further comprising a viscosity enhancing water soluble polymer.

Embodiment 47

The emulsion composition of any one of embodiments 38-46, further comprising a gas.

Embodiment 48

The emulsion composition of any one of embodiments 38-47, further comprising an alkylamine or arylamine.

Embodiment 49

The emulsion composition of embodiment 48, wherein said alkylamine is diisopropylamine.

Embodiment 50

The emulsion composition of embodiment 48, wherein said alkylamine is an alkylpolyamine.

Embodiment 51

The emulsion composition of embodiment 50, wherein said alkylpolyamine is dimethylaminopropylamine, triethylenetetramine or diethylenetriamine.

Embodiment 52

The emulsion composition of embodiment 48, wherein said arylamine is aniline.

Embodiment 53

A method of displacing an unrefined petroleum material in contact with a solid material, said method comprising:
(i) contacting an unrefined petroleum material with an aqueous composition comprising water, a surfactant and the compound of one of embodiments 1 to 22, wherein said unrefined petroleum material is in contact with a solid material;
(ii) allowing said unrefined petroleum material to separate from said solid material thereby displacing said unrefined petroleum material in contact with said solid material.

Embodiment 54

The method of embodiment 53, further comprising contacting said solid material with said aqueous composition.

Embodiment 55

The method of embodiment 53 or 54, wherein said compound is present in an amount sufficient to increase the solubility of said surfactant relative to the absence of said compound.

Embodiment 56

The method of any one of embodiments 53-55, wherein said method is an enhanced oil recovery method.

Embodiment 57

The method of any one of embodiments 53-56, wherein said natural solid material is rock or regolith.

Embodiment 58

The method of embodiment 57, wherein said regolith is soil.

Embodiment 59

The method of any one of embodiments 53-58, wherein an emulsion forms after said contacting.

What is claimed is:

1. A method of displacing an unrefined petroleum material in contact with a solid material, the method comprising:
   (i) contacting the unrefined petroleum material with an aqueous composition comprising water, a surfactant and a compound having the formula:

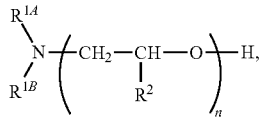

wherein $R^{1A}$ and $R^{1B}$ are independently unsubstituted C1-C8 alkyl, unsubstituted cycloalkyl, unsubstituted heterocycloalkyl, unsubstituted aryl, and unsubstituted heteroaryl,
$R^2$ is hydrogen or unsubstituted C1-C2 alkyl; n is an integer from 1 to 30; wherein the unrefined petroleum material is in contact with a solid material; and
   (ii) allowing the said-unrefined petroleum material to separate from the solid material thereby displacing the unrefined petroleum material in contact with the solid material and forming an emulsion comprising the unrefined petroleum and the aqueous composition.

2. The method of claim 1, wherein $R^{1A}$ and $R^{1B}$ are independently unsubstituted $C_1$-$C_6$ alkyl.

3. The method of claim 1, wherein $R^{1A}$ and $R^{1B}$ are unsubstituted isopropyl.

4. The method of claim 1, wherein $R^2$ is hydrogen and n is an integer from 1 to 3.

5. The method of claim 1, wherein the aqueous composition comprises a plurality of different surfactants.

6. The method of claim 1, wherein the aqueous composition further comprises an alkali agent.

7. The method of claim 1, wherein the aqueous composition further comprises an alkylamine or arylamine.

8. The method of claim 7, wherein the aqueous composition further comprises an alkylamine, and wherein the alkylamine comprises diisopropylamine.

9. The method of claim 1, wherein the emulsion comprises a microemulsion.

10. The method of claim 1, wherein n is an integer from 2 to 30.

* * * * *